US012737204B2

(12) United States Patent
Narayanan et al.

(10) Patent No.: US 12,737,204 B2
(45) Date of Patent: Sep. 15, 2026

(54) COMMAND LINE INTERFACE INFORMATION VISUALIZATION SYSTEM

(71) Applicant: Dell Products L.P., Round Rock, TX (US)

(72) Inventors: Padmanabhan Narayanan, Chennai (IN); NarayanaSwamy Perumal, Chennai (IN); Aravind Mani, Tiruvannamalai District (IN)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 18/657,910

(22) Filed: May 8, 2024

(65) Prior Publication Data

US 2025/0348340 A1 Nov. 13, 2025

(51) Int. Cl.

| | |
|---|---|
| ***G06F 9/455*** | (2018.01) |
| ***G06F 9/44*** | (2018.01) |
| ***G06F 9/451*** | (2018.01) |
| ***G06F 9/48*** | (2006.01) |
| ***G06F 15/173*** | (2006.01) |
| ***G06F 16/25*** | (2019.01) |
| ***H04L 67/10*** | (2022.01) |

(52) U.S. Cl.
CPC .......... *G06F 9/45512* (2013.01); *G06F 9/451* (2018.02)

(58) Field of Classification Search
CPC .... G06F 9/451; G06F 9/45512; G06F 3/0489; G06F 8/38; G06F 3/04845; G06F 3/0481; G06F 16/1873; G06F 8/71; G06F 3/14; G06F 9/455; G06F 21/53; G06F 21/629; G06F 9/5055; G06F 9/45533; G06F 9/45508; H04L 67/567; H04L 67/141; H04L 67/34; H04L 67/566
See application file for complete search history.

(56) References Cited

U.S. PATENT DOCUMENTS

| | | | | |
|---|---|---|---|---|
| 5,734,820 | A * | 3/1998 | Howard | H04L 63/083 726/21 |
| 11,868,765 | B2 * | 1/2024 | Pitts | G06F 9/451 |
| 12,190,081 | B1 * | 1/2025 | Visser | G06N 20/00 |

OTHER PUBLICATIONS

K. Jordan, Learn a Command-line Interface, 40 pages (Year: 2022).*

* cited by examiner

*Primary Examiner* — Thuy Dao
(74) *Attorney, Agent, or Firm* — Joseph Mencher

(57) ABSTRACT

A Command Line Interface (CLI) information visualization system includes a management device coupled to a computing device. The computing device includes a CLI subsystem that provides a CLI session on the computing device for the management device. The computing device also includes a Visualization Co-Pilot (VCP) subsystem that receives a CLI command from the CLI subsystem that was provided by the management device during the CLI session, and determines one or more visualization applications that are configured to generate a visualization associated with the execution of the CLI command. The VCP subsystem then generates visualization access information using the CLI command, uses the visualization access information to access at least one visualization generated by the one or move visualization applications, and provides the at least one visualization for display on the management device.

20 Claims, 34 Drawing Sheets

```
[
  {
    "app": "Grafana", "ip": "100.104.98.204", "port": "10001",
    "show-system-cpu": "https://<ip>:<port>/node-exporter-full?orgId=1&from=<start-time>&to=<end-time>&var-job=<hostname>&jwt=<grafana-jwt-token>",
    "show-interface-ethernet": "https://<ip>:<port>/dell-enterprise-sonic-interface-rate?orgId=1&var-datasource=Dell%20Prometheus%20&var-Sampling=1m&var-switch=<hostname>&var-netif=<interface-list>&jwt=<grafana-jwt-token>",
    "show-interface-transceiver-dom": "https://<ip>:<port>/transceiver-dom?orgId=1&var-datasource=Dell%20Prometheus%20&var-Sampling=1m&var-switch=<hostname>&var-netif=<interface-list>& from=<start-time>&to=<end-time>&jwt=<grafana-jwt-token>",
    "show-bgp-ipv4-unicast-summary": "https://<ip>:<port>/dell-enterprise-sonic-bgp-neighbors?orgId=1&var-datasource=Dell%20Prometheus%20&var-Sampling=1m&var-switch=<hostname>& from=<start-time>&to=<end-time>&jwt=<grafana-jwt-token>"
  },
  {
    "app": "CloudIQ", "ip": "100.104.98.205", "port": "9443",
    "show-system-cpu": https://<ip>:<port>/#/systems/networking/<hostname>&jwt=<cloudiq-jwt-token>,
    "show-interface-transceiver-dom": "https://<ip>:<port>/#/systems/networking/<hostname>&var-netif=<interface-list>&jwt=<cloudiq-jwt-token>"
  },
  {
    "app": "Oxidized", "ip": "100.104.98.206", "port": "8888",
    "show-running-configuration": "http://<ip>:<port>/node/version/diffs?node=<hostname>&from=<start-time>&to=<end-time>"
  },
  {
    "app": "Zabbix", "ip": "100.104.98.207", "port": "10051",
    "show-alarm": "http://<ip>:<port>/zabbix/zabbix.php?action=problems.view&node=<hostname>"
  },
  {
    "app": "Local", "ip": "100.104.98.35", "port": "8080",
    "show-switch-port-profile": "http://<ip>:<port>/port-profile.html"
    "show-platform-syseeprom": "http://<ip>:<port>/platform-syseeprom.html"
  }
]
```

602, 604, 606, 608, 610

VCP CONFIGURATION INFORMATION 600

FIG. 6

CLI APPLICATION 800

```
atios10login-eqx-13 ~ > ssh admin@100.104.98.35
Debian GNU/Linux 10
admin@100.104.18.132's password:
Linux sonic 5.10.0-21-amd64 #1 SMP Debian 5.10.162-1 (2023-01-21) x86_64
You are on
SONiC
-- Software for Open Networking in the Cloud --

Unauthorized access and/or use are prohibited.
All access and/or use are subject to monitoring.

Help:    http://azure.github.io/SONiC/

admin@sonic:~$ sonic-cli
sonic#
```

802

VCP APPLICATION 1000

This Visualization Co-Pilot is attached to:

| | |
|---|---|
| Base Mac Address | :1C:72:1D:CB:C5:3F |
| Service Tag | :3C1QY03 |
| Hostname | : Dell-S5248F |
| Management IP | : 100.104.98.35 |
| Software Version | : rel_dell_sonic_4.x_share.1465-b96c5fd3d |
| Product | : Generic |
| Distribution | : Debian 10.13 |
| Kernel | : 5.10.0-21-amd64 |
| Config DB Version | : version_4_2_1 |
| Build Commit | : b96c5fd3d |
| Build Date | : Mon Jan 1 23:31:18 UTC 2024 |
| Built By | : dngnetbuild.svc@jenkinsworker-eqx-03 |
| Platform | : x86_64-dellemc_s5248f_c3538-r0 |
| HwSKU | : DellEMC-S5248f-P-25G-DPB |
| ASIC | : broadcom |
| Hardware Version | : A01 |
| Serial Number | : TH01Y8WPCET0029D1ZR2 |
| Uptime | : 15:25:39 up 13 days, 6:02, 1 user, load average: 1.65, 1.66, 1.76 |
| Mfg | : Dell EMC |

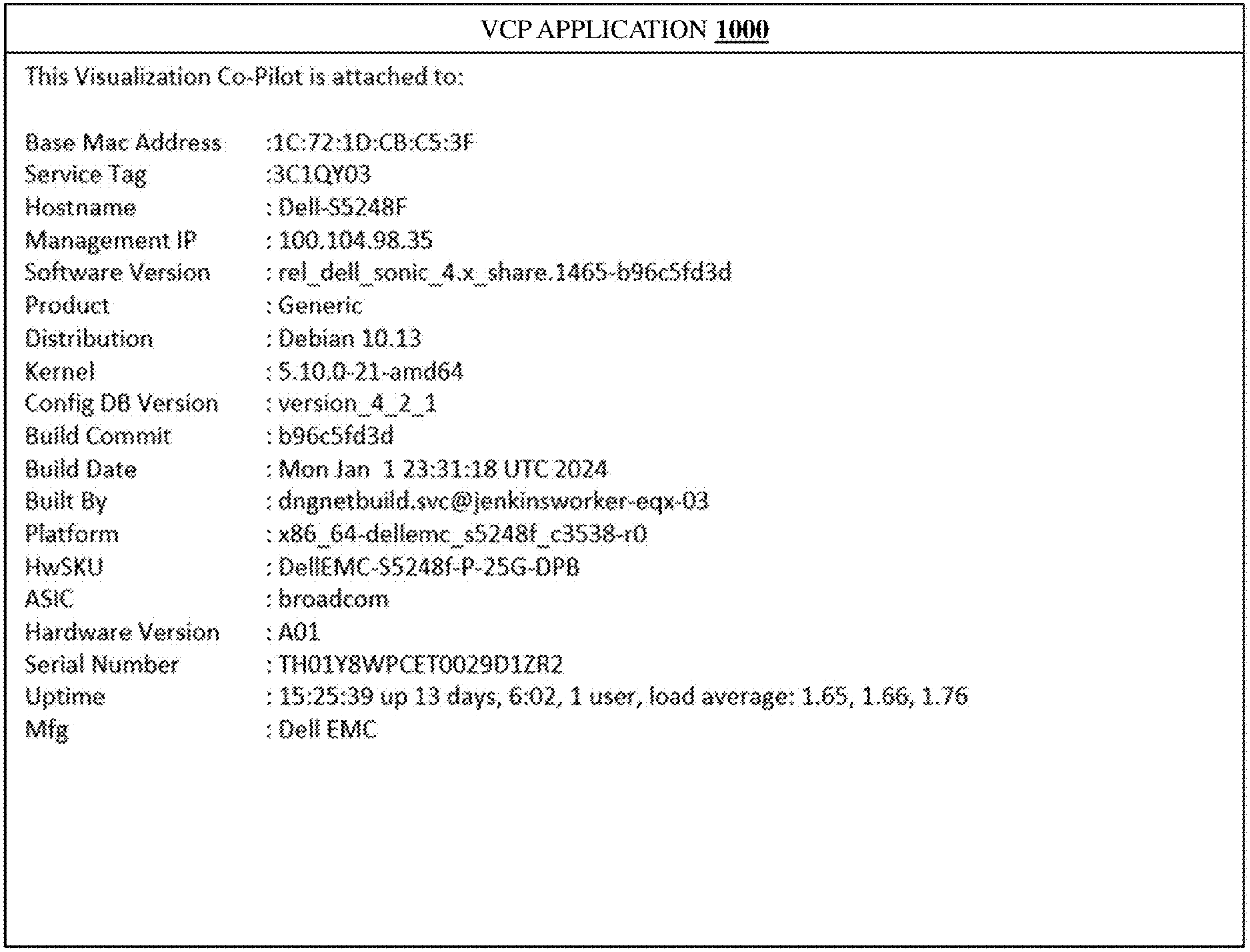

FIG. 10

CLI APPLICATION 800

```
Dell-S5248F# show system cpu
-------------------------------------------
CPU        %KERNEL      %USER      %IDLE
-------------------------------------------
CPU-ALL    14           26         60
CPU-0      15           24         61
CPU-1      16           25         59
CPU-2      13           29         58
CPU-3      12           36         62
Dell-S5248F#
```

1100

1102

CLI APPLICATION 800

```
Dell-S5248F# show interface Ethernet 10        <- 1200
Ethernet10 is up, line protocol is up, reason oper-up
Hardware is Eth, address is c0:3e:ba:dd:26:82
Mode of IPV4 address assignment: not-set
Mode of IPV6 address assignment: not-set
Interface IPv6 oper status: Disabled

            <snip>

Last clearing of "show interface" counters: never
10 seconds input rate 25000 packets/sec, 780 bits/sec, 1081 Bytes/sec
10 seconds output rate 25000 packets/sec, 120 bits/sec, 790 Bytes/sec
Input statistics:
     41820 packets, 7138761 octets
     61820 Multicasts, 0 Broadcasts, 0 Unicasts
     0 error, 0 discarded, 0 Oversize
Output statistics:
     21978 packets, 5654791 octets
     211 Multicasts, 1 Broadcasts, 0 Unicasts
     0 error, 0 discarded, 0 Oversize
Dell-S5248F#
```

1202

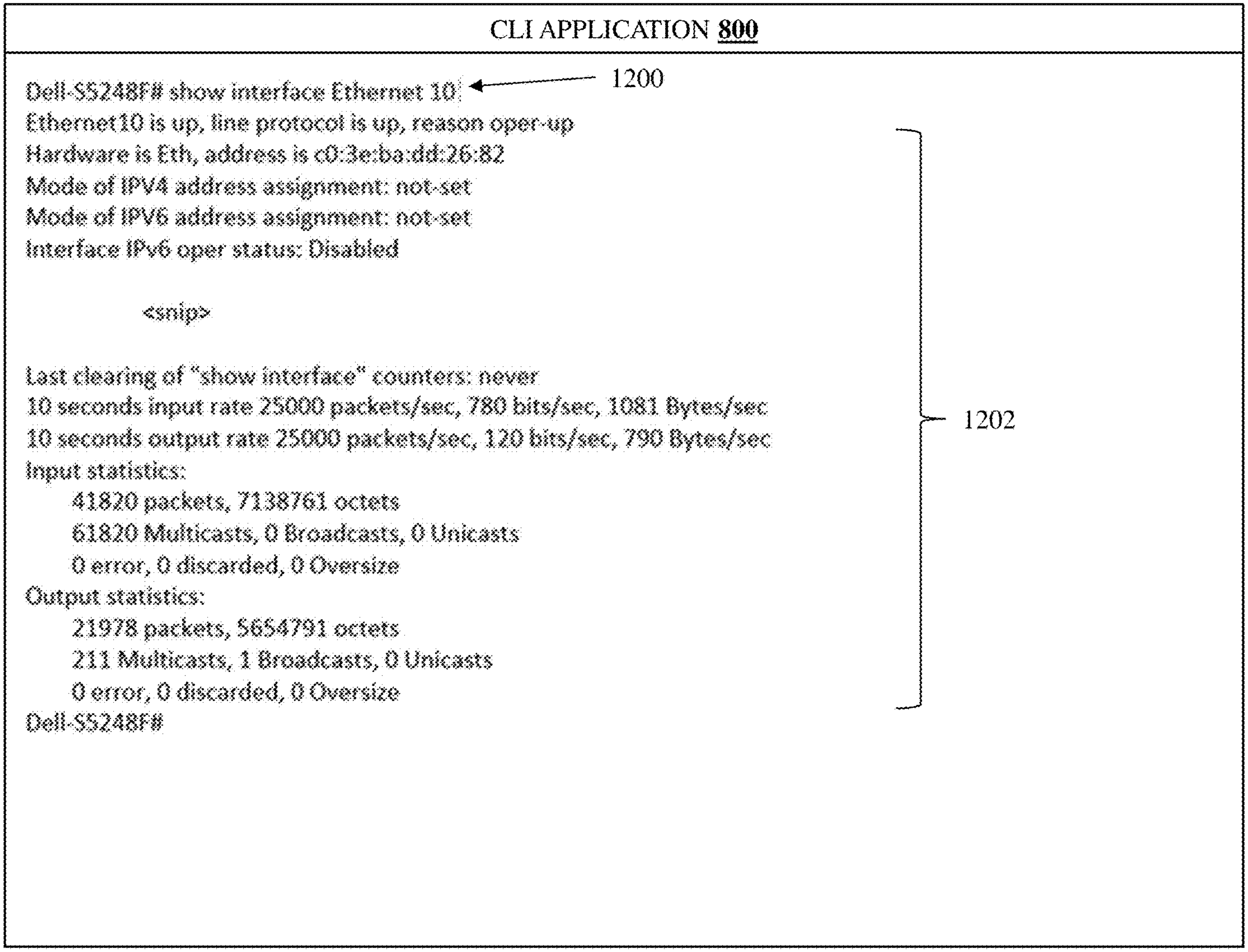

FIG. 12A

CLI APPLICATION 800

```
Dell-S5248F# show interface Ethernet 10-11,36
Ethernet10 is up, line protocol is up, reason oper-up

                    <snip>

Output statistics:
    21824 packets, 5597282 octets
      156 Multicasts, 1 Broadcasts, 0 Unicasts
    0 error, 0 discarded, 0 Oversize

Ethernet11 is up, line protocol is up, reason oper-up

                    <snip>

Output statistics:
    56342 packets, 8523273 octets
     1034 Multicasts, 11 Broadcasts, 0 Unicasts
    0 error, 0 discarded, 0 Oversize

Ethernet36 is up, line protocol is up, reason oper-up

                    <snip>

Output statistics:
    73451 packets, 14577387 octets
      213 Multicasts, 31 Broadcasts, 0 Unicasts
    0 error, 0 discarded, 0 Oversize

Dell-S5248F#
```

1300

1302

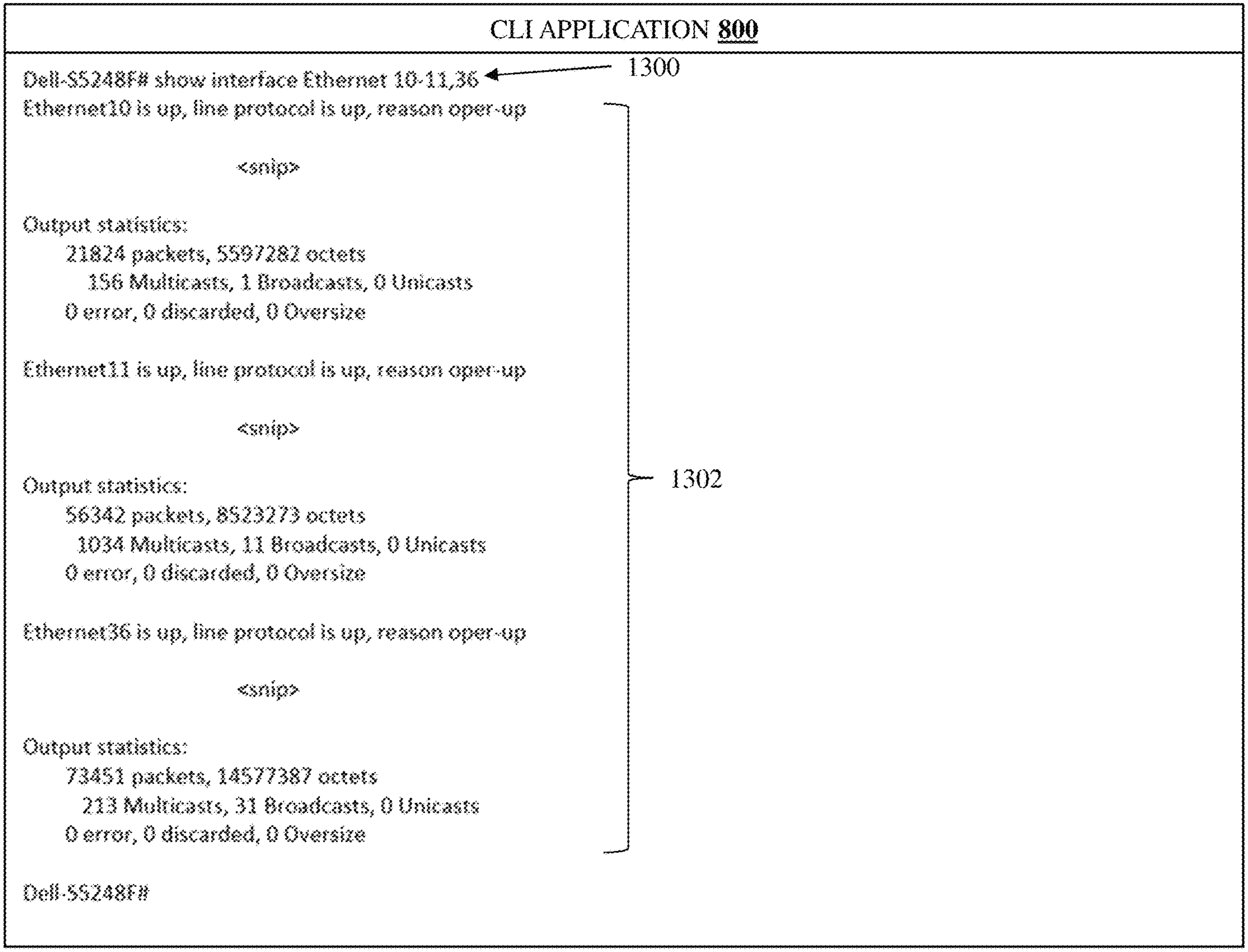

FIG. 13A

CLI APPLICATION 800

1400

```
Dell-S5248F# show interface Ethernet10 since 3h
Ethernet10 is up, line protocol is up, reason oper-up
Hardware is Eth, address is c0:3e:ba:dd:26:82
Mode of IPV4 address assignment: not-set
Mode of IPV6 address assignment: not-set
Interface IPv6 oper status: Disabled

        <snip>

Last clearing of "show interface" counters: never
10 seconds input rate 180000 packets/sec, 211 bits/sec, 318 Bytes/sec
10 seconds output rate 115 packets/sec, 87 bits/sec, 7 Bytes/sec
Input statistics:
    71820 packets, 9899769 octets
    511820 Multicasts, 0 Broadcasts, 0 Unicasts
    0 error, 0 discarded, 0 Oversize
    940409 Packets (128 to 255 Octects)
Output statistics:
    71120 packets, 9899762 octets
    511623 Multicasts, 1 Broadcasts, 0 Unicasts
    0 error, 0 discarded, 0 Oversize
Dell-S5248F#
```

1402

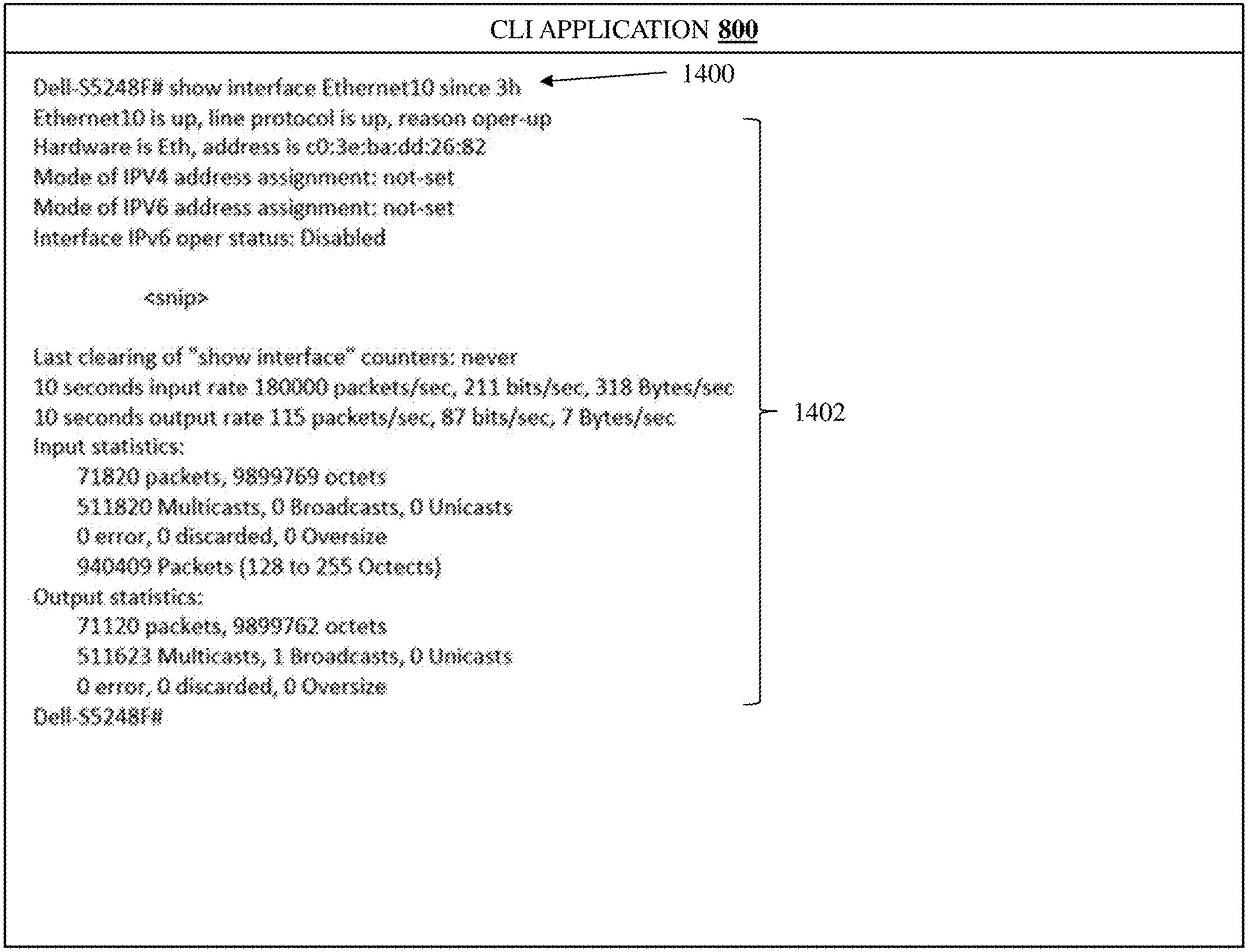

FIG. 14A

CLI APPLICATION 800

1500

```
Dell-S5248F# show interface transceiver dom Ethernet8
  Identifier: SFP
  Vendor Name: FINISAR CORP.
  Vendor Part: FTLX8571D3BCL-FC
  ModuleMonitorValues:
    Temperature: 29.7539 C
    Vcc: 3.3739 Volts
  ChannelMonitorValues:
    Rx1Power: -1.1324 dBm
    Tx1Bias: 7.766 mA
    Tx1Power: -2.2526 dBm
  ChannelThresholdValues:
    RxPowerHighAlarm  : 0 dBm
    RxPowerHighWarning: -1.0002 dBm
    RxPowerLowAlarm   : -20 dBm
    RxPowerLowWarning : -18.0134 dBm
    TxBiasHighAlarm   : 13.2 mA
    TxBiasHighWarning : 12.6 mA
    TxBiasLowAlarm    : 4 mA
    TxBiasLowWarning  : 5 mA
    TxPowerHighAlarm  : 0 dBm
    TxPowerHighWarning: -1.0002 dBm
    TxPowerLowAlarm   : -5.9998 dBm
    TxPowerLowWarning : -5.0004 dBm
  ModuleThresholdValues:
    TempHighAlarm  : 78 C
    TempHighWarning: 73 C
    TempLowAlarm   : -13 C
    TempLowWarning : -8 C
    VccHighAlarm   : 3.7 Volts
    VccHighWarning : 3.6 Volts
    VccLowAlarm    : 2.9 Volts
    VccLowWarning  : 3 Volts
Dell-S5248F#
```

1502

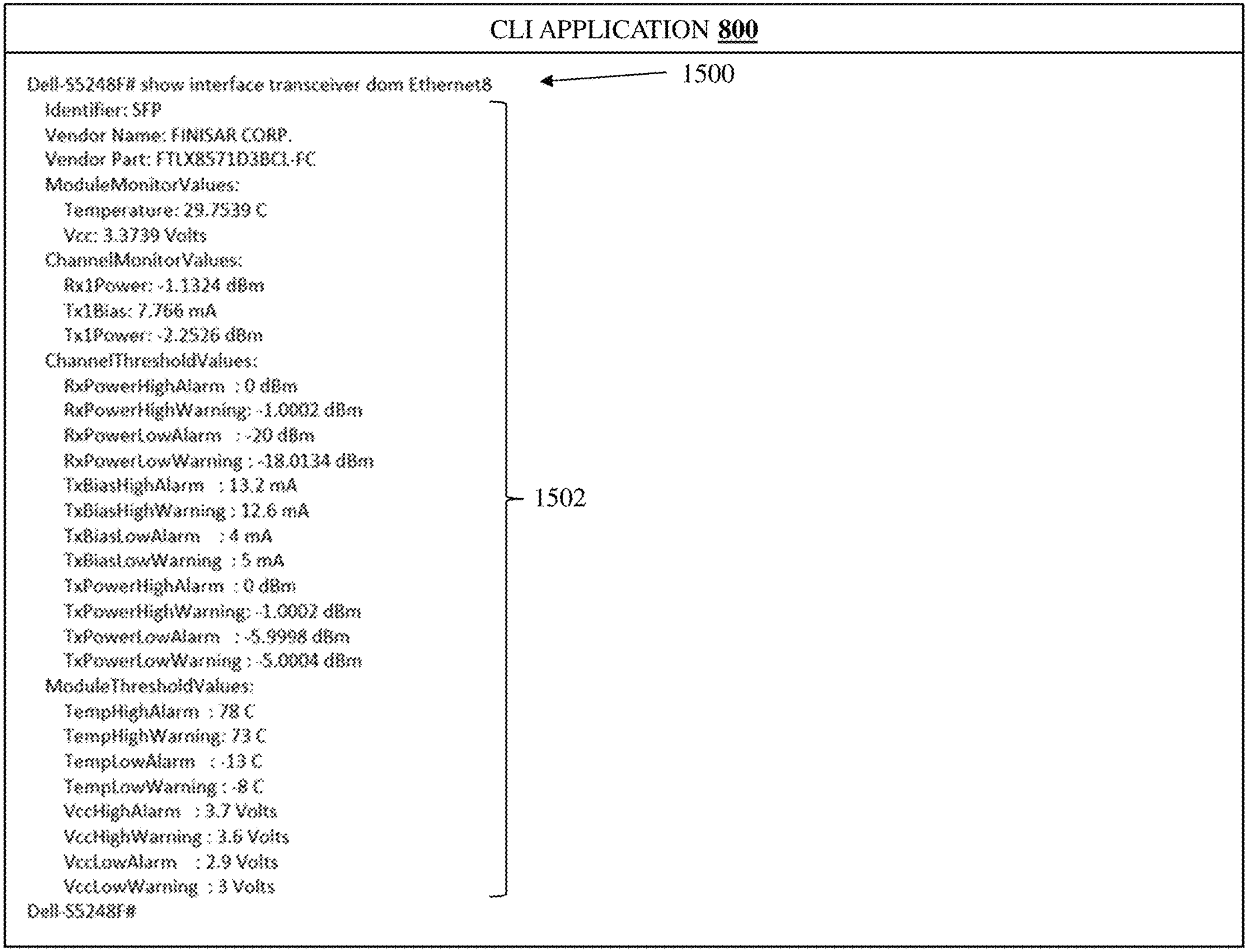

FIG. 15A

CLI APPLICATION 800

1600

```
Dell-S5248F# show running-configuration
!
ip load-share hash ipv4 ipv4-dst-ip
ip load-share hash ipv4 ipv4-src-ip
ip load-share hash ipv4 ipv4-ip-proto
ip load-share hash ipv4 ipv4-l4-src-port
ip load-share hash ipv4 ipv4-l4-dst-port
ip load-share hash ipv6 ipv6-dst-ip
ip load-share hash ipv6 ipv6-src-ip
ip load-share hash ipv6 ipv6-next-hdr
ip load-share hash ipv6 ipv6-l4-src-port
ip load-share hash ipv6 ipv6-l4-dst-port
hostname Dell-S5248F
ptp mode disable
ptp network-transport l2 multicast
ptp ipv6-scope 0xe
ptp domain 1
ptp domain-profile default
ptp two-step disable
ptp priority1 128
ptp priority2 128
ptp log-announce-interval 0
ptp announce-timeout 10

mac address-table aging-time 600
kdump enable
kdump memory 0M-2G:256M,2G-4G:256M,4G-8G:384M,8G-:448M
kdump num-dumps 3
core enable
factory default profile l3 confirm
port-group 1 speed 25000
port-group 2 speed 25000
port-group 3 speed 25000
--more--
```

1602

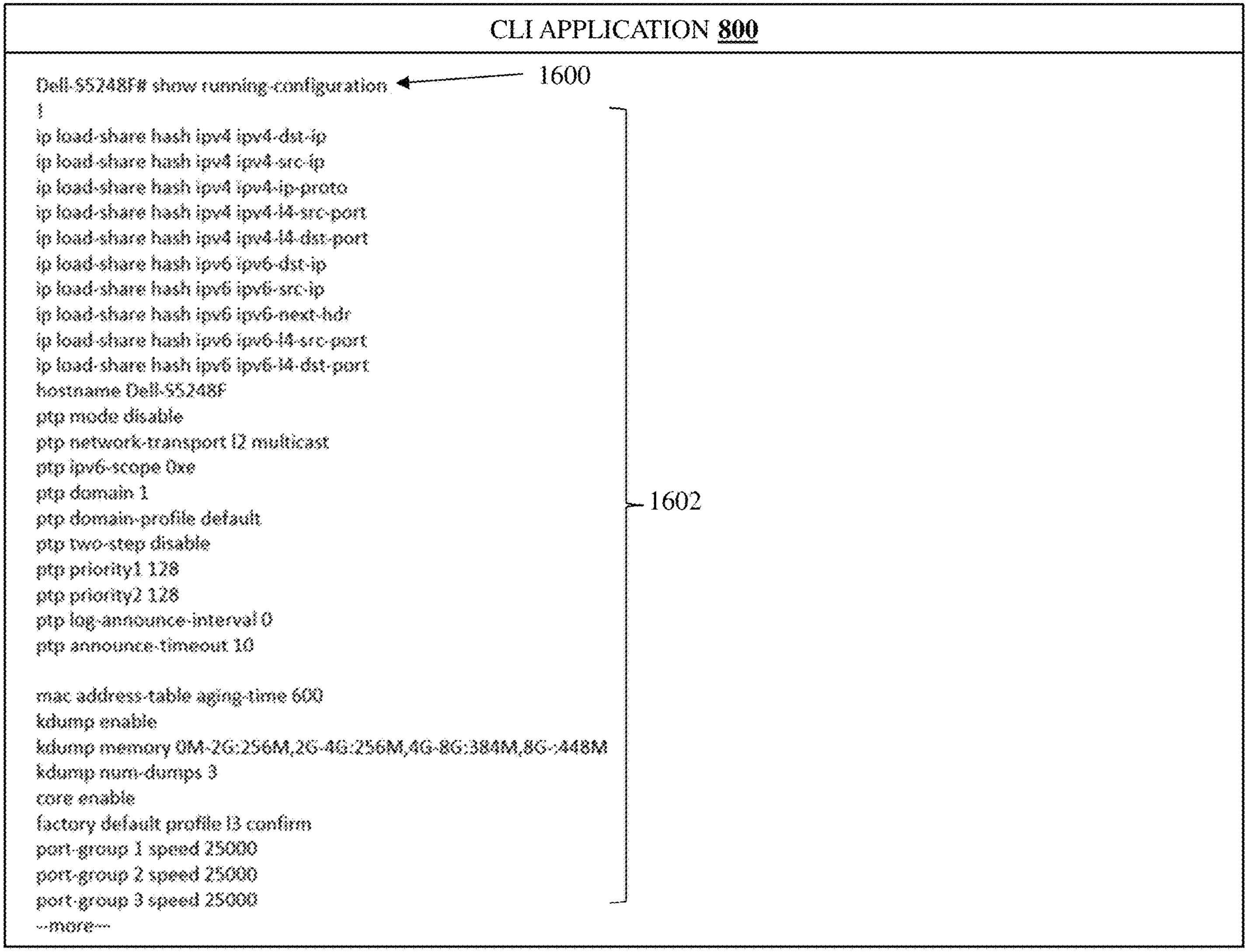

FIG. 16A

VCP APPLICATION 1000

"show bgp ipv4 unicast summary" 1804

1806a

1806

| Neighbor | V | AS | MsgRcvd | MsgSent | InQ | OurQ | Up/Down | State/PfxRcd |
|---|---|---|---|---|---|---|---|---|
| 14.14.14.1 | 4 | 65001 | 8 | 2 | 0 | 0 | 00:00:43 | ESTABLISHED |
| 14.14.14.2 | 4 | 65002 | 13 | 5 | 0 | 0 | 00:00:31 | IDLE |
| 14.14.14.3 | 4 | 65003 | 7 | 6 | 0 | 0 | 00:00:01 | ACTIVE |
| 14.14.14.4 | 4 | 65004 | 21 | 3 | 0 | 0 | 00:12:05 | ESTABLISHED |
| 14.14.14.5 | 4 | 65005 | 9 | 4 | 0 | 0 | 00:12:05 | ESTABLISHED |

CLI APPLICATION 800

```
Dell-S5248F# show switch-port-profile 1/1
| Node/Unit | Current | Next-boot | Default   |
|-----------+---------+-----------+-----------|
| 1/1       |profile-4 | profile-4  | profile-2 |
Supported Profiles:
profile-1
profile-2
profile-3
profile-4
profile-5
profile-6
Dell-S5248F#
```

1900

1902

CLI APPLICATION 800

2000

```
Dell-S5248F# show platform syseeprom
-----------------------------------------------
Attribute          Value/State
-----------------------------------------------
Base Mac Address    :1C:72:1D:CB:C5:3F
Crc 32              :0xC99F7592
Platform            :X86_64-dellemc_s5248f_c3538-r0
Device Version      :1
Diag Version        :3.40.4.1-6
Hardware Version    :A02
Product Name        :S5248F-ON
Location            :Slot 1
Mac Addresses       :256
Manufacture Country :TH
Mfg Date            :2020-07-01
Mfg Name            :CET00
Onie Version        :3.40.1.1-6
Part Number         :0GM4RM
Serial Number       :TH0GM4RMCET0006U00DY
Service Tag         :3C1QY03
Vendor Ext          :0x00 0x00 0x02 0xA2
Vendor Name         :Dell EMC
Dell-S5248F#
```

2002

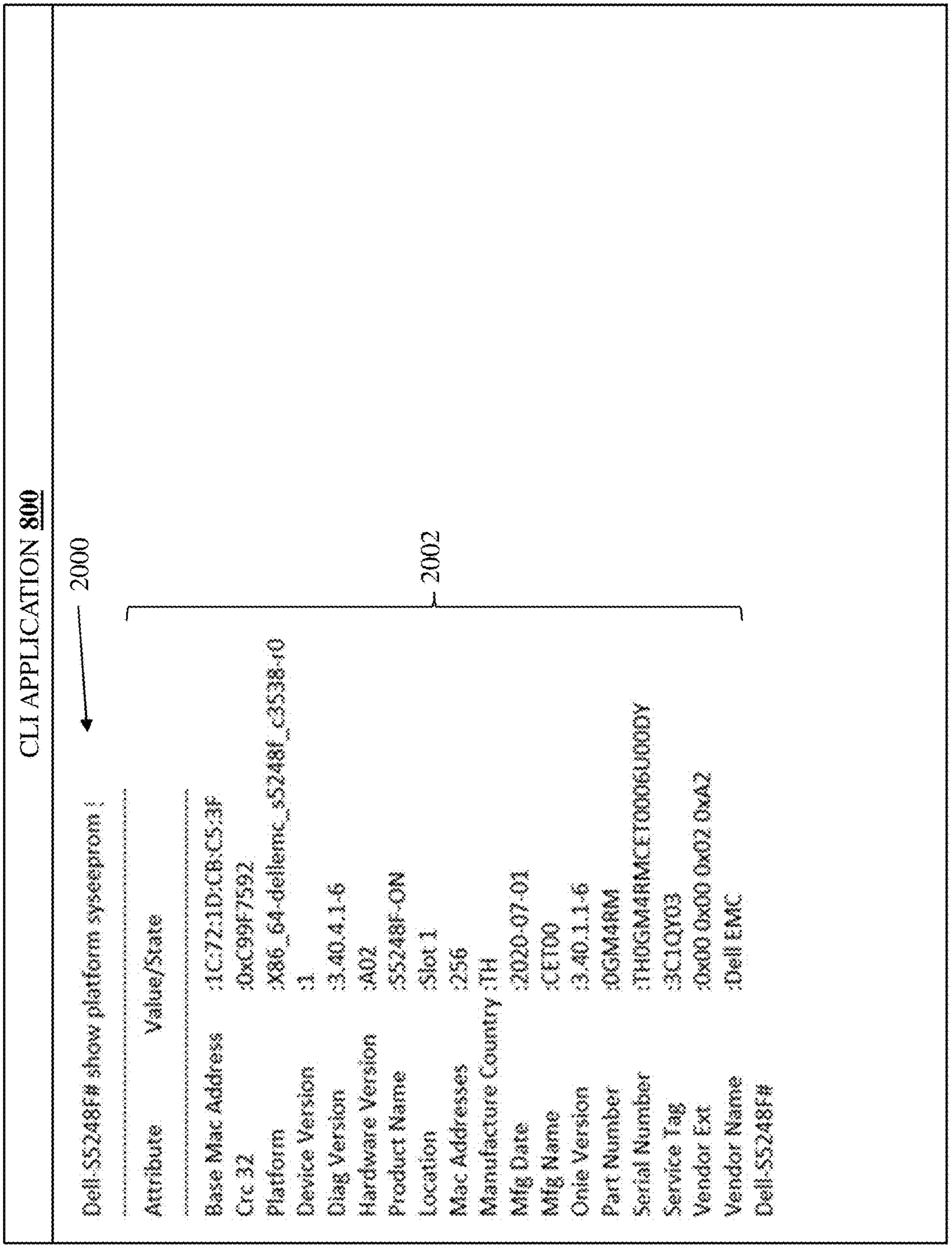

FIG. 20A

COMMAND LINE INTERFACE INFORMATION VISUALIZATION SYSTEM

BACKGROUND

The present disclosure relates generally to information handling systems, and more particularly to providing visualizations for information associated with Command Line Interface (CLI) commands provided to information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is often desirable to monitor the operation of information handlings systems such as, for example, switch devices and/or other networking devices known in the art. The primary means for monitoring such networking devices is a Command Line Interface (CLI) that is provided with a Network Operating System (NOS) on the networking device and may allow hundreds of different "show" commands to be provided by the network administrator or other user via the CLI to perform that monitoring. However, the monitoring of such networking devices may also be performed using Graphical User Interface (GUI)-based visualization applications such as the Grafana web analytics and monitoring application, the Prometheus monitoring and alerting toolkit, the InfluxDB time series data store, the Telegraf plugin-driven agent, the Zabbix infrastructure monitoring tool, the Oxidized networking device configuration tool, etc. As such, network device monitoring trends are moving towards the use of the CLI with dis-aggregated visualization applications that each specialize in specific areas of networking device monitoring and that are siloed with respect to each other, which requires a user to manually switch back and forth between the CLI and those visualization applications and provide different commands (CLI commands in the CLI, and commands generated by selecting Graphical User Interface (GUI) buttons, tabs, and/or other elements in the visualization applications) in order to access and visualize any particular networking device information of interest.

Accordingly, it would be desirable to provide a networking device monitoring system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Visualization Co-Pilot (VCP) engine that is configured to: receive, from a Command Line Interface (CLI) subsystem, a CLI command provided by a management device during a CLI session provided with the CLI subsystem; determine one or more visualization applications that are configured to generate a visualization associated with the execution of the CLI command; generate, using the CLI command, visualization access information; access, using the visualization access information, at least one visualization generated by the one or move visualization applications; and provide, for display on the management device, the at least one visualization.

BRIEF DESCRIPTION OF THE DRAWINGS

FIG. 6 is an screenshot view illustrating an embodiment of a configuration file that may be provided to the networking device of FIG. 3 during the method of FIG. 4.

FIG. 10 is screenshot view illustrating an embodiment of a VCP application displayed on the management device of FIG. 9 during the method of FIG. 4.

FIG. 12A is screenshot view illustrating an embodiment of a CLI application displayed on the management device of FIG. 9 during the method of FIG. 4.

FIG. 13A is screenshot view illustrating an embodiment of a CLI application displayed on the management device of FIG. 9 during the method of FIG. 4.

FIG. 14A is screenshot view illustrating an embodiment of a CLI application displayed on the management device of FIG. 9 during the method of FIG. 4.

FIG. 15A is screenshot view illustrating an embodiment of a CLI application displayed on the management device of FIG. 9 during the method of FIG. 4.

FIG. 16A is screenshot view illustrating an embodiment of a CLI application displayed on the management device of FIG. 9 during the method of FIG. 4.

FIG. 20A is screenshot view illustrating an embodiment of a CLI application displayed on the management device of FIG. 9 during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
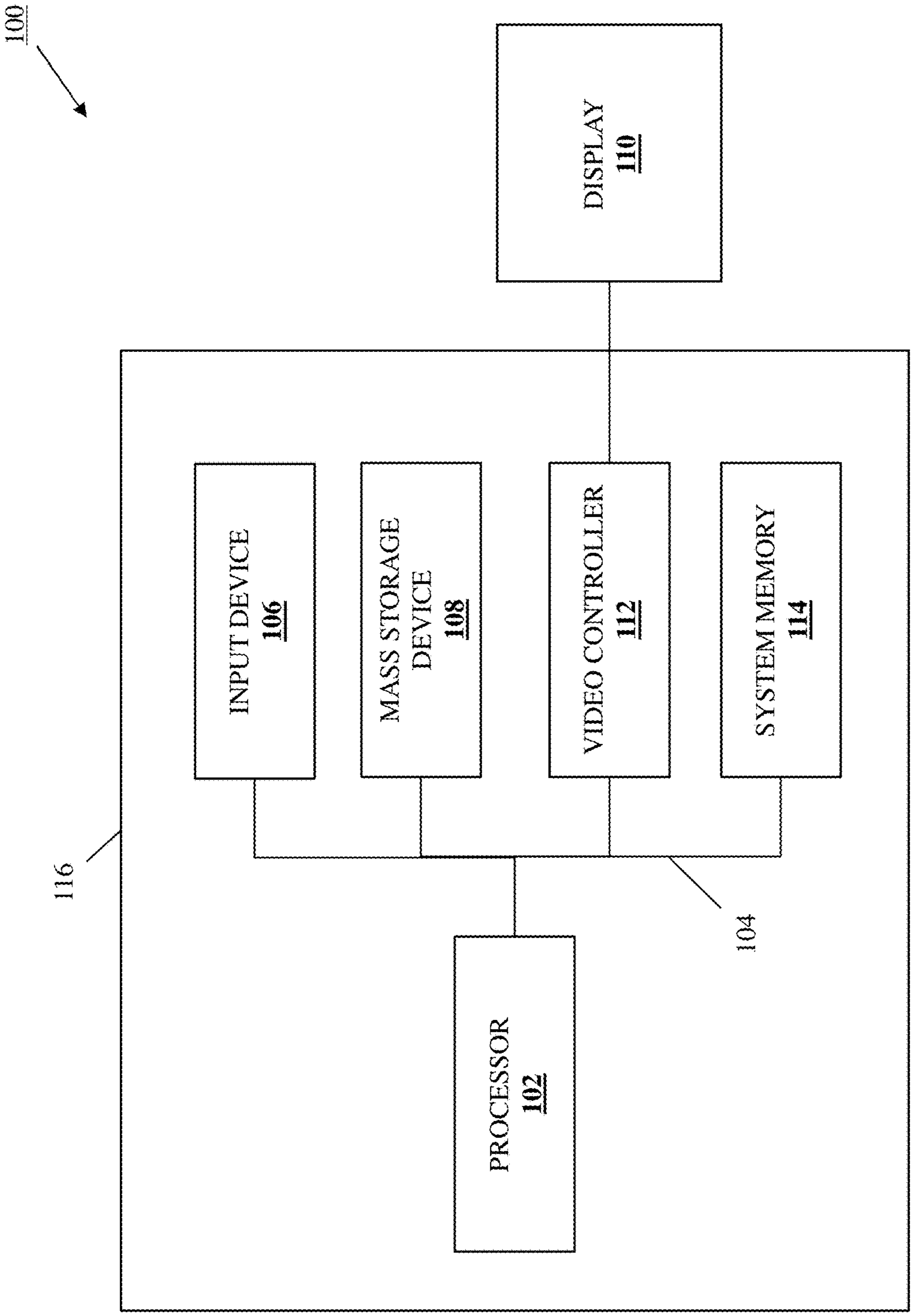
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
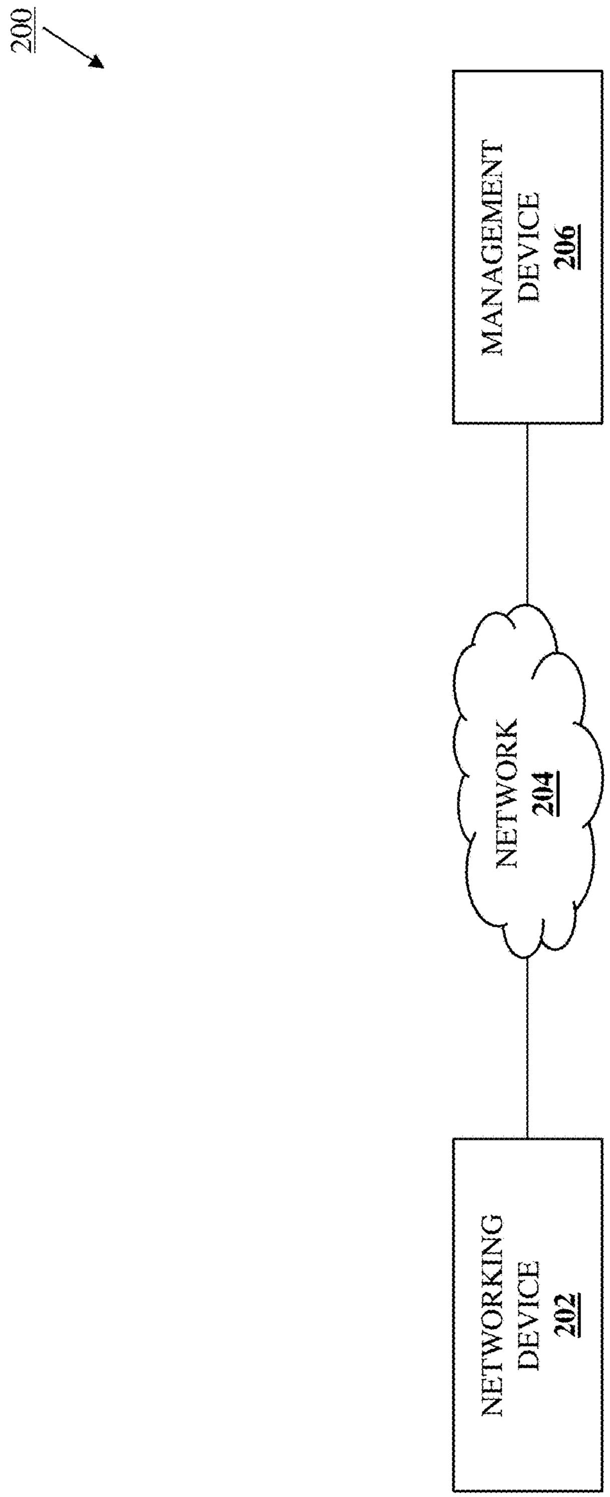
FIG. 2 is a schematic view illustrating an embodiment of a networked system that may provide the CLI information visualization system of the present disclosure.

Referring now to FIG. 2, an embodiment of a networked system 200 is illustrated that may provide the CLI information visualization system of the present disclosure. In the illustrated embodiment, the networked system 200 includes a networking device 202. In an embodiment, the networking device 202 may be provided by the IHS 100 discussed above with reference to FIG. 1, and/or may include some or all of the components of the IHS 100, and in specific examples may be provided by a switch device. However, while illustrated and discussed as being provided by a switch device, one of skill in the art in possession of the present disclosure will recognize that the networking device 202 provided in the networked system 200 may be replaced by any computing devices that may be configured to operate similarly as the networking device 202 discussed below.

In the illustrated embodiment, the networking device 202 is coupled to a network 204 that may be provided by a Local Area Network (LAN), the Internet, combinations thereof, and/or any other network that would be apparent to one of skill in the art in possession of the present disclosure. Furthermore, a management device 206 is coupled to the network 204. In an embodiment, the management device 206 may be provided by the IHS 100 discussed above with reference to FIG. 1, and/or may include some or all of the components of the IHS 100, and in specific examples may be provided by a desktop computing device, a laptop/notebook computing device, a tablet computing device, a mobile phone, and/or other management devices that would be apparent to one of skill in the art in possession of the present disclosure. However, while illustrated and discussed as being provided by particular devices, one of skill in the art in possession of the present disclosure will recognize that the management device 206 provided in the networked system 200 may be replaced by any computing devices that may be configured to operate similarly as the management device 206 discussed below. Furthermore, while a specific networked system 200 has been illustrated and described, one of skill in the art in possession of the present disclosure will recognize that the CLI information visualization system of the present disclosure may be provided in networked systems with a variety of components and component configurations while remaining within the scope of the present disclosure as well.

Figure 3:
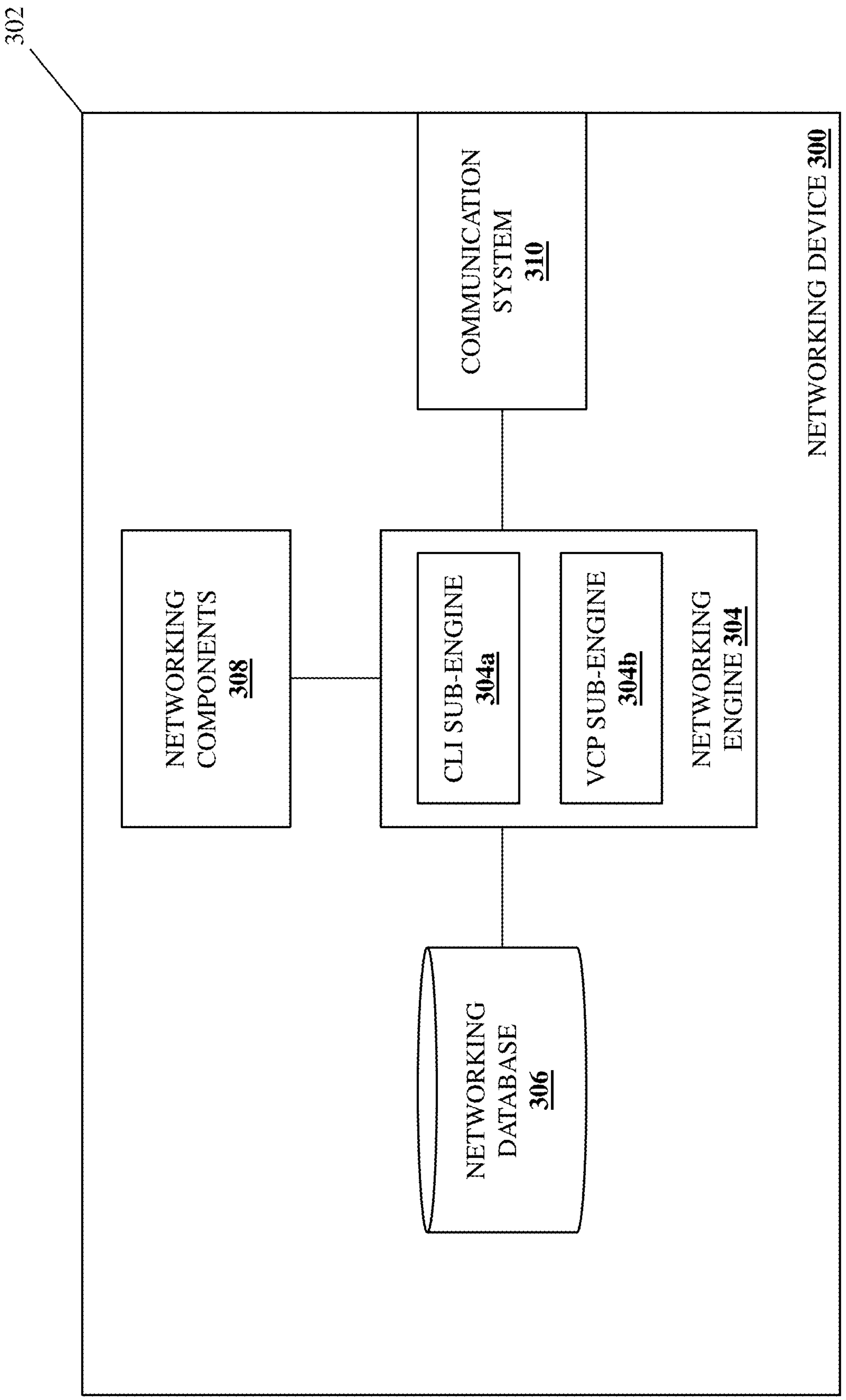
FIG. 3 is a schematic view illustrating an embodiment of a networking device that may be included in the networked system of FIG. 2.

Referring now to FIG. 3, an embodiment of a networking device 300 is illustrated that may provide the networking device 202 discussed above with reference to FIG. 2. As such, the networking device 300 may be provided by the IHS 100 discussed above with reference to FIG. 1 and/or may include some or all of the components of the IHS 100, and in specific examples may be provided by a switch device. Furthermore, while illustrated and discussed as being provided by a particular networking device, one of skill in the art in possession of the present disclosure will recognize that the functionality of the networking device 300 discussed below may be provided by other computing devices that are configured to operate similarly as the networking device 300 discussed below.

In the illustrated embodiment, the networking device 300 includes a chassis 302 that houses the components of the networking device 300, only some of which are illustrated and described below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a networking engine 304 that is configured to perform the functionality of the networking engines and/or networking devices discussed below.

In the examples illustrated in FIG. 3 and described below, the networking engine 304 includes a Command Line Interface (CLI) sub-engine 304*a* and a Visualization Co-Pilot (VCP) sub-engine 304*b* that are configured to perform the functionality of the CLI sub-engines, CLI subsystem, VCP sub-engines, VCP subsystems, and/or networking devices discussed below. To provide some specific examples, the networking engine 304 may be configured to provide an operating system (e.g., a Network Operating System (NOS) such OS9, OS10, or Enterprise SONiC available from DELL® Inc. of Round Rock, Texas, United States) for the networking device 300, with the CLI sub-engine 304*a* configured to provide a CLI for that operating system, and the VCP sub-engine 304*b* configured to provide a VCP daemon that performs the VCP functionality described below. However, while specific engines are illustrated and described, one of skill in the art in possession of the present disclosure will appreciate how the functionality described below may be enabled in a variety of manners that will fall within the scope of the present disclosure as well.

The chassis 302 may also house a storage system (not illustrated, but which may include the storage 108 discussed above with reference to FIG. 1) that is coupled to the networking engine 304 (e.g., via a coupling between the storage system and the processing system) and that includes a networking database 306 that is configured to store any of the information utilized by the networking engine 304 discussed below. The chassis 302 may also house a communication system 310 that is coupled to the networking engine 304 (e.g., via a coupling between the communication system 310 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific networking device 300 has been illustrated and described, one of skill in the art in possession of the present disclosure will recognize that networking devices (or other computing devices operating according to the teachings of the present disclosure in a manner similar to that described below for the networking device 300) may include a variety of components and/or component configurations for providing conventional networking device functionality, as well as the CLI information visualization functionality discussed below, while remaining within the scope of the present disclosure as well.

Figure 4:
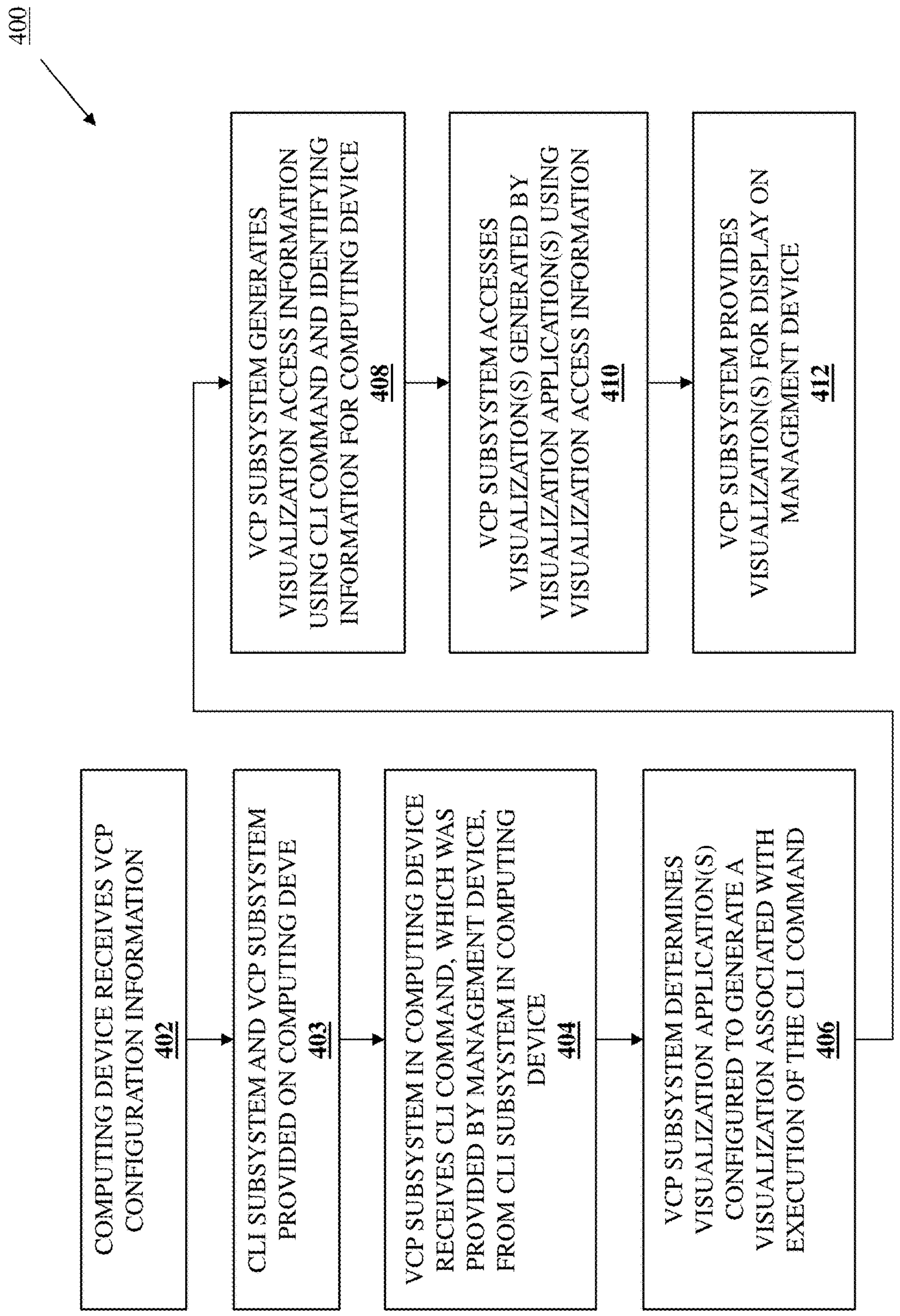
FIG. 4 is a flow chart illustrating an embodiment of a method for visualizing information associated with CLI commands.

Referring now to FIG. 4, an embodiment of a method 400 for visualizing information associated with Command Line Interface (CLI) commands is illustrated. As discussed below, the systems and methods of the present disclosure provide a "Visualization Co-Pilot" that "snoops" CLI commands and uses them to access and display visualization(s) that are associated with the execution of those CLI commands and that may be generated by GUI-based visualization application(s). For example, the CLI information visualization system of the present disclosure may include a management device coupled to a computing device. The computing device includes a CLI subsystem that provides a CLI session on the computing device for the management device. The computing device also includes a VCP subsystem that receives a CLI command from the CLI subsystem that was provided by the management device during the CLI session, and determines one or more visualization applications that are configured to generate a visualization associated with the execution of the CLI command. The VCP subsystem then generates visualization access information using the CLI command, uses the visualization access information to access at least one visualization generated by the one or move visualization applications, and provides the at least one visualization for display on the management device. As such, a user of a CLI may use that CLI as the primary tool to interact with a computing device, while having the most relevant visualizations for the responses to their CLI commands provided by the VCP without having to manually switch between the CLI and/or multiple visualization applications.

Figure 5A:
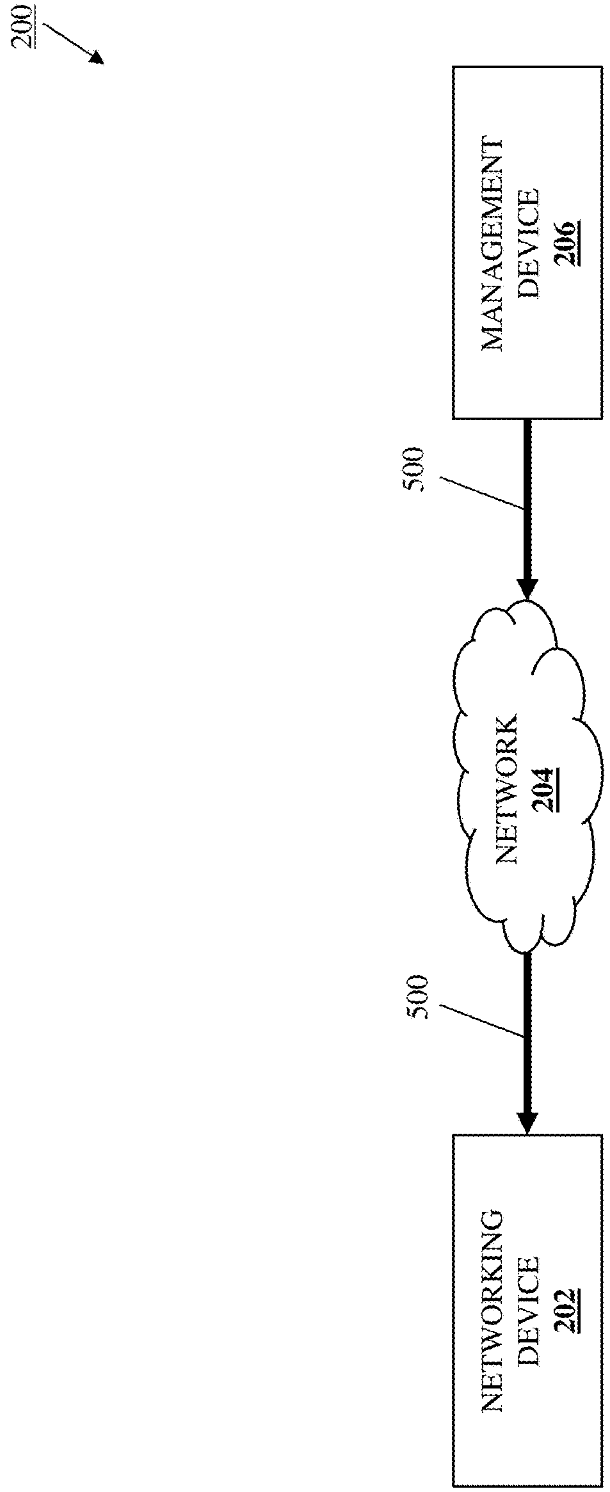
FIG. 5A is a schematic view illustrating an embodiment of the networked system of FIG. 2 operating during the method of FIG. 4.
Figure 5B:
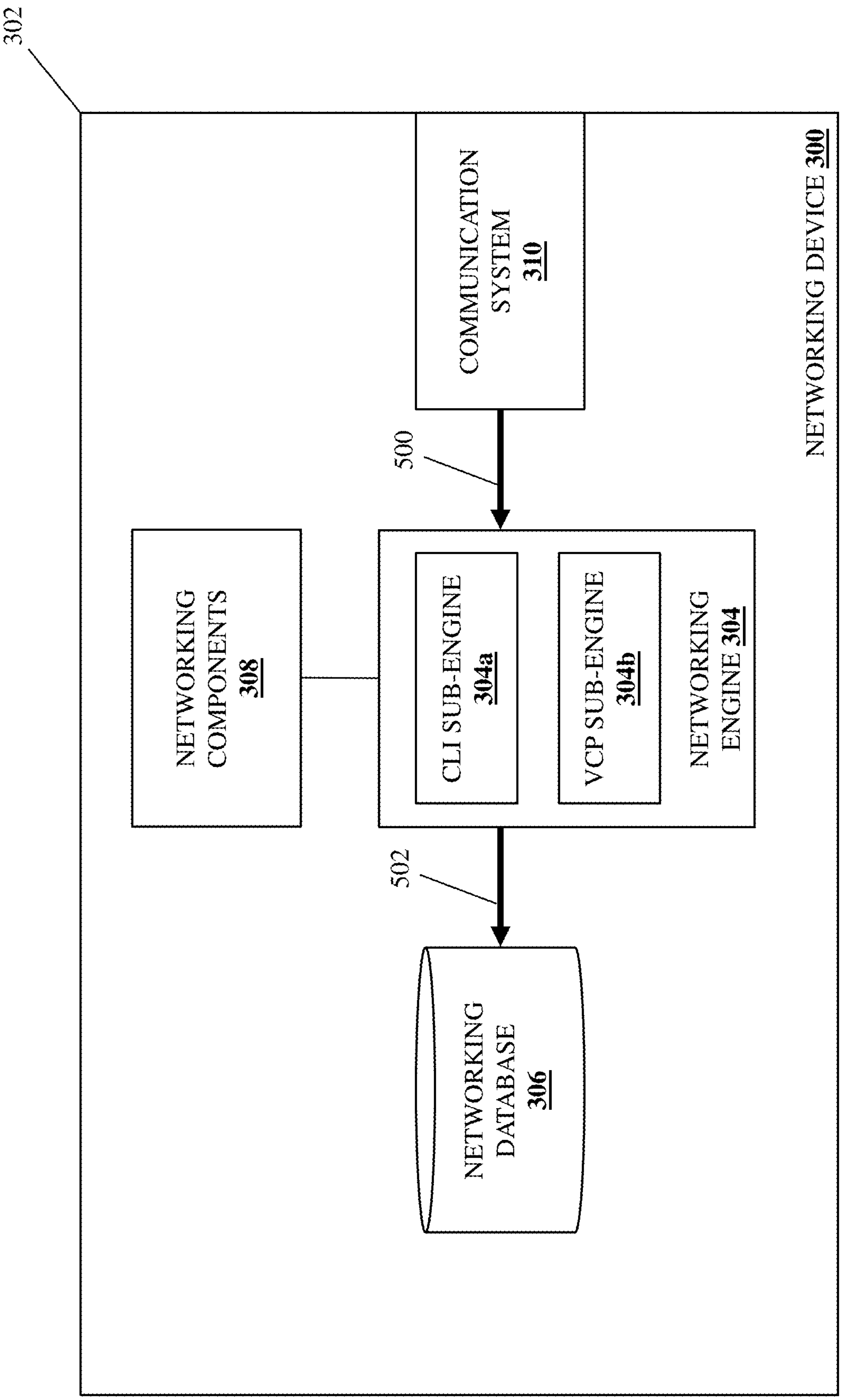
FIG. 5B is a schematic view illustrating an embodiment of the networking device of FIG. 3 operating during the method of FIG. 4.

The method 400 begins at block 402 where a computing device receives VCP configuration information. With reference to FIGS. 5A and 5B, in an embodiment of block 402, the management device 206 may perform VCP configuration information provisioning operations 500 that may include transmitting VCP configuration information via the network 204 to the networking device 202/300 such that the networking engine 304 in the networking device 202/300 receives that VCP information via its communication system 310. The networking engine 304 may then perform VPC configuration information storage operations 502 that include storing the VCP configuration information in its networking database 306.

As will be appreciated by one of skill in the art in possession of the present disclosure, the VCP configuration information may be generated based on knowledge of the CLI commands for the CLI application utilized by the management device 206 and the visualization applications included on or accessible to the management device 206, with any or all of those CLI commands mapped to particular visualizations (e.g., GUIs, panels, pages, etc.) of information requested via the CLI command. For example, embodiments of the VCP configuration information may include URLs that are derived via the access of visualization applications natively (i.e., via a browser) when navigating via their dashboards, panels, screens, and then templatized (with the parameters described below) and mapped to the most relevant CLI commands. As such, any of a variety of CLI command/visualization mappings may be provided to enable the functionality described below.

In an embodiment, the VCP configuration information may be provided in a Java Script Object Notation (JSON) file and may be pushed to the networking device 202/300 during "Zero Touch Provisioning" (ZTP) operations, using a mechanism available in Ansible open-source software during runtime of the networking device 202/300, and/or using any other techniques that would be apparent to one of skill in the art in possession of the present disclosure. As discussed below, the VCP configuration information may include one or more objects that each represent a configuration for a particular visualization application that will be accessible to the VCP sub-engine 304*b*, and/or any information that is configured to allow the VCP sub-engine 304*b* to provide the functionality described below.

For example, with reference to FIG. 6, a specific embodiment of a VCP configuration information 600 is illustrated and described for use in the examples provided below. In the illustrated embodiment, the VCP configuration information 600 is provided in a JSON file and includes a plurality of visualization application information objects 602, 604, 606, 608, and 610, with the specific example included in FIG. 6 providing "external visualization application objects" for visualization applications that may be provided on the management device 206 (or otherwise external to the networking device 202/300) and that include a visualization application information object 602 for a Grafana web analytics and monitoring application, a visualization application information object 604 for a CloudIQ monitoring and analytics application, a visualization application information object 606 for a Oxidized networking device configuration tool, and a visualization application information object 608 for a Zabbix infrastructure monitoring tool, as well as an "internal application object" for a visualization application that may be provided on the networking device 202/300 and that includes a visualization application information object 610 for a local visualization application (e.g., a networking-device-specific daemon/docker that is configured to update local pages in the networking device 202/300).

As illustrated, each visualization application information object 602-610 includes visualization application access information that is provided by an Internet Protocol (IP) address and a port at which its corresponding visualization application is accessible, with the visualization application information object 602 including an IP address "100.104.98.204" and port "10001" for the Grafana web analytics and monitoring application, the visualization application information object 604 including an IP address "100.104.98.205" and port "9443" for the CloudIQ monitoring and analytics application, the visualization application information object 606 including an IP address "100.104.98.206" and port "8888" for the Oxidized networking device configuration tool, and the visualization application information object 608 including an IP address "100.104.98.207" and port "10051" for the Zabbix infrastructure monitoring tool, and the visualization application information object 610 including an IP address "100.104.98.35" and port "8080" for the local visualization application.

As illustrated, each visualization application information object 602-610 includes one or more CLI command keys for CLI commands that will be acted upon by the VCP sub-engine 304*a*, along with a Universal Resource Locator (URL) template for each CLI command key that is used by the VCP sub-engine 304*a* to generate a URL that provides the visualization access information in the specific examples described below, and one of skill in the art in possession of the present disclosure will appreciate how the URL templates provide an example of the provisioning of a portion of the visualization access information that will be generated using the CLI command in the visualization application information objects 602-610. For example, the visualization application information object 602 includes CLI command keys "show-system-cpu", "show-interface-ethernet", "show-interface-transceiver-dom", and "show-bgp-ipv4-unicast-summary" for the Grafana web analytics and monitoring application, along with respective URL templates that include bolded portions in FIG. 6 that will be provided (e.g., via the parameter substitution operations described below) by the VCP sub-engine 304*a* (e.g. "start-time", "end-time", "interface-list", "hostname", and "grafana-jwt-token" in the specific example provided).

Similarly, the visualization application information object 604 includes CLI command keys "show-system-cpu" and "show-interface-transceiver-dom", along with respective URL templates that include bolded portions in FIG. 6 that will be provided (e.g., via the parameter substitution operations described below) by the VCP sub-engine 304*a* (e.g. "interface-list", "hostname", and "clougiq-jwt-token" in the specific example provided). Similarly as well, the visualization application information object 606 includes a CLI command key "show-running-configuration", along with a respective URL template that includes bolded portions in FIG. 6 that will be provided (e.g., via the parameter substitution operations described below) by the VCP sub-engine 304*a* (e.g. "start-time", "end-time", and "hostname" in the specific example provided).

Similarly as well, the visualization application information object 608 includes a CLI command key "show-alarm", along with a respective URL template that includes a bolded portion in FIG. 6 that will be provided (e.g., via the parameter substitution operations described below) by the VCP sub-engine 304*a* (e.g. "hostname" in the specific example provided). Similarly as well, the visualization application information object 610 includes CLI command keys "show-switch-port-profile" and "show-platform-sys-eeprom", along with respective URLs. However, while specific VCP configuration information has been illustrated and described, one of skill in the art in possession of the present disclosure will appreciate how any of a variety of VCP configuration information will fall within the scope of the present disclosure as well.

Figure 7:
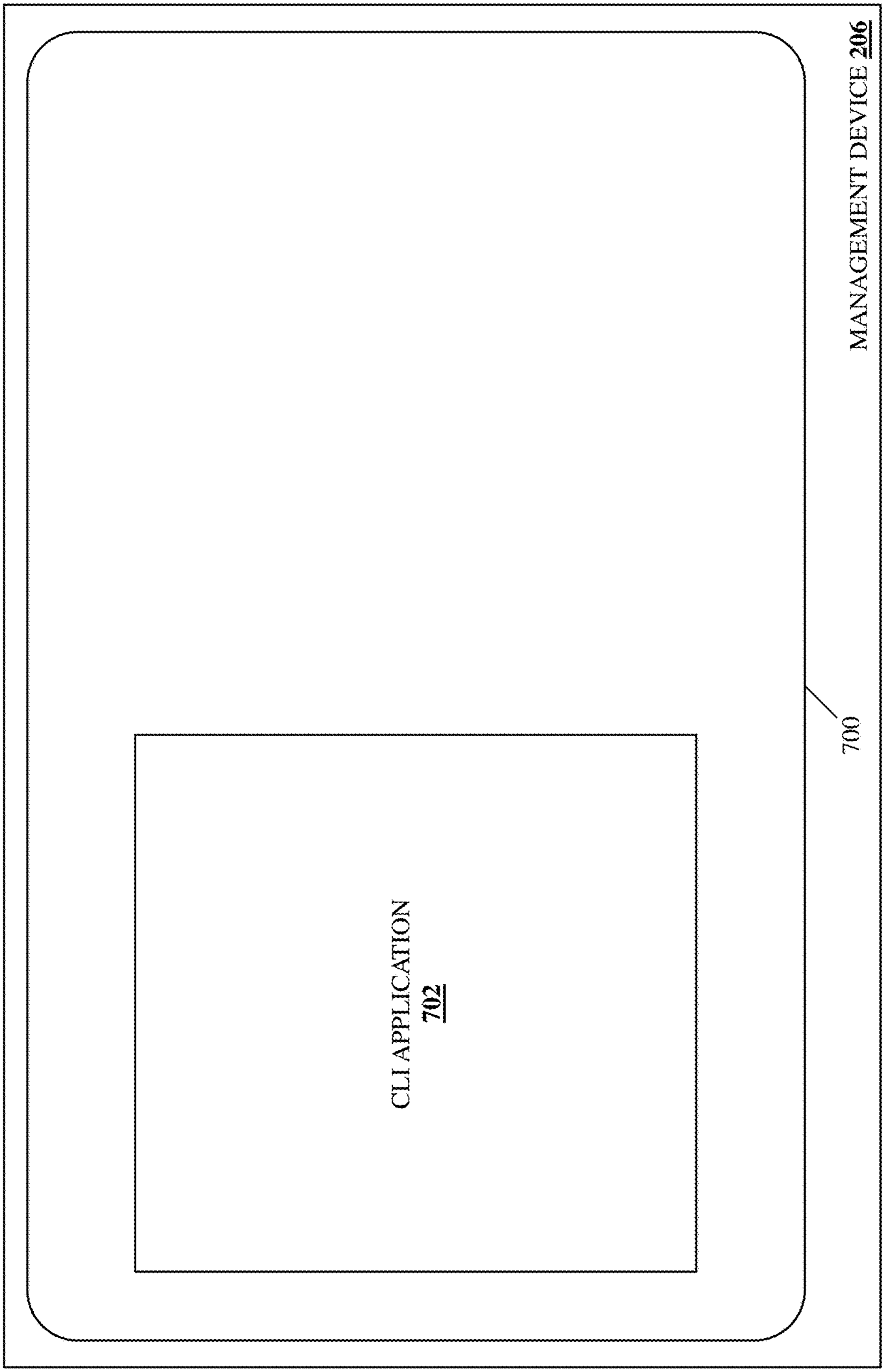
FIG. 7 is a screenshot view illustrating an embodiment of a management device in the networked system of FIG. 2 operating during the method of FIG. 4.
Figure 8A:
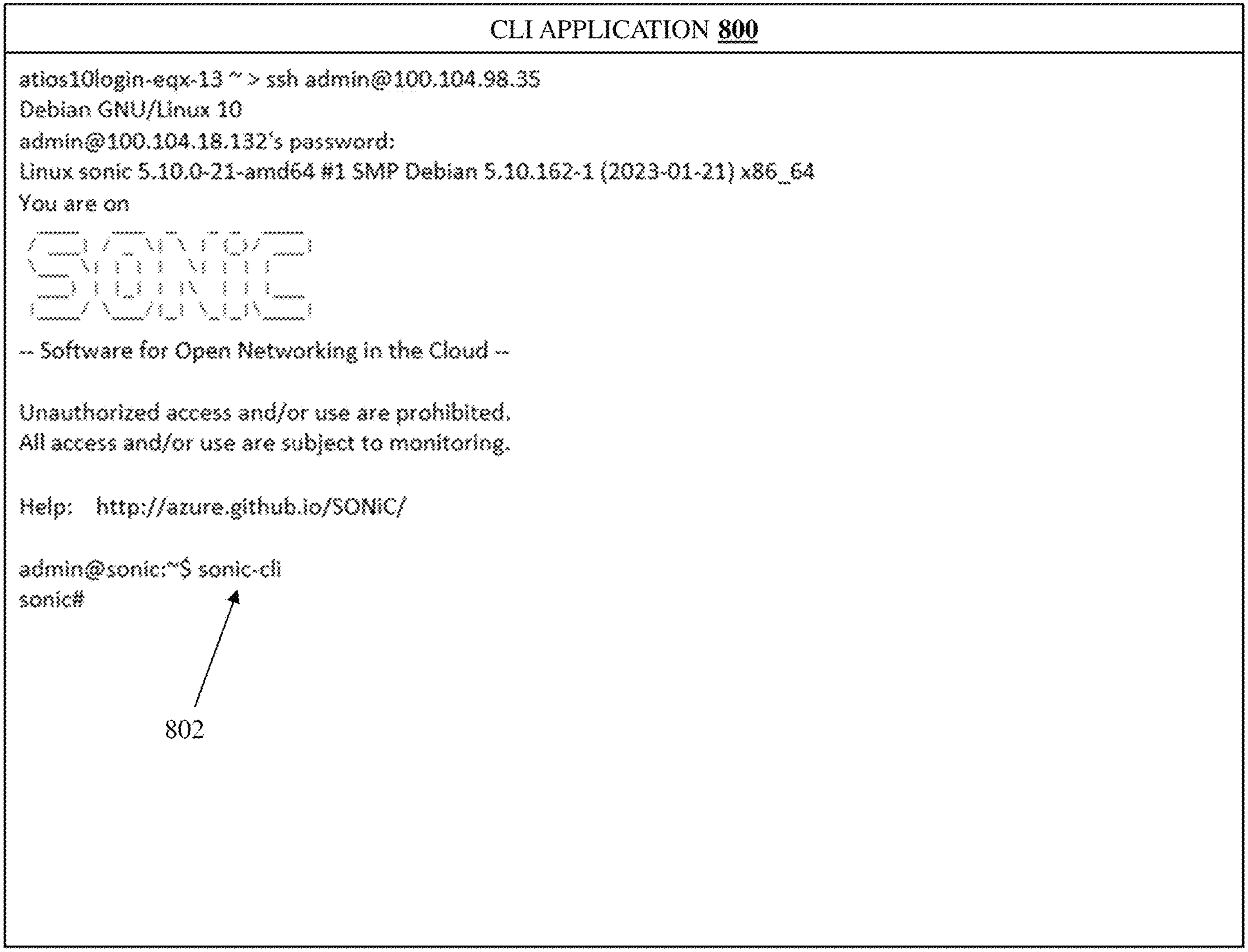
FIG. 8A is screenshot view illustrating an embodiment of a CLI application displayed on the management device in the networked system of FIG. 2 during the method of FIG. 4.

The method 400 then proceeds to block 403 where a CLI subsystem and a VCP subsystem are provided on the computing device. With reference to FIG. 7, the management device 206 is illustrated including a display device 700. In an embodiment, at block 403, a network administrator or other user of the management device 206 may "launch" or otherwise instruct the provisioning of a CLI application 702 on the management device 206 using any of a variety of CLI provisioning techniques that would be apparent to one of skill in the art in possession of the present disclosure. For example, with reference to FIG. 8A, an embodiment of a CLI application 800 is illustrated that may provide the CLI application 702, with the specific example illustrating a CLI application for the Enterprise SONiC operating system available from DELL® Inc. of Round Rock, Texas, United States. One of skill in the art in possession of the present disclosure will appreciate how FIG. 8A illustrates an embodiment in which the user has logged into a CLI session on the networking device 202/300 (e.g., at a URL "100.104.98.35" in the illustrated example, and via a serial console, terminal emulator application, a Secure SHell (SSH) protocol, etc.), and provided a CLI launch instruction 802 (e.g., "sonic-cli") to start the CLI provided via the CLI application 702/800 in that CLI session.

Figure 8B:
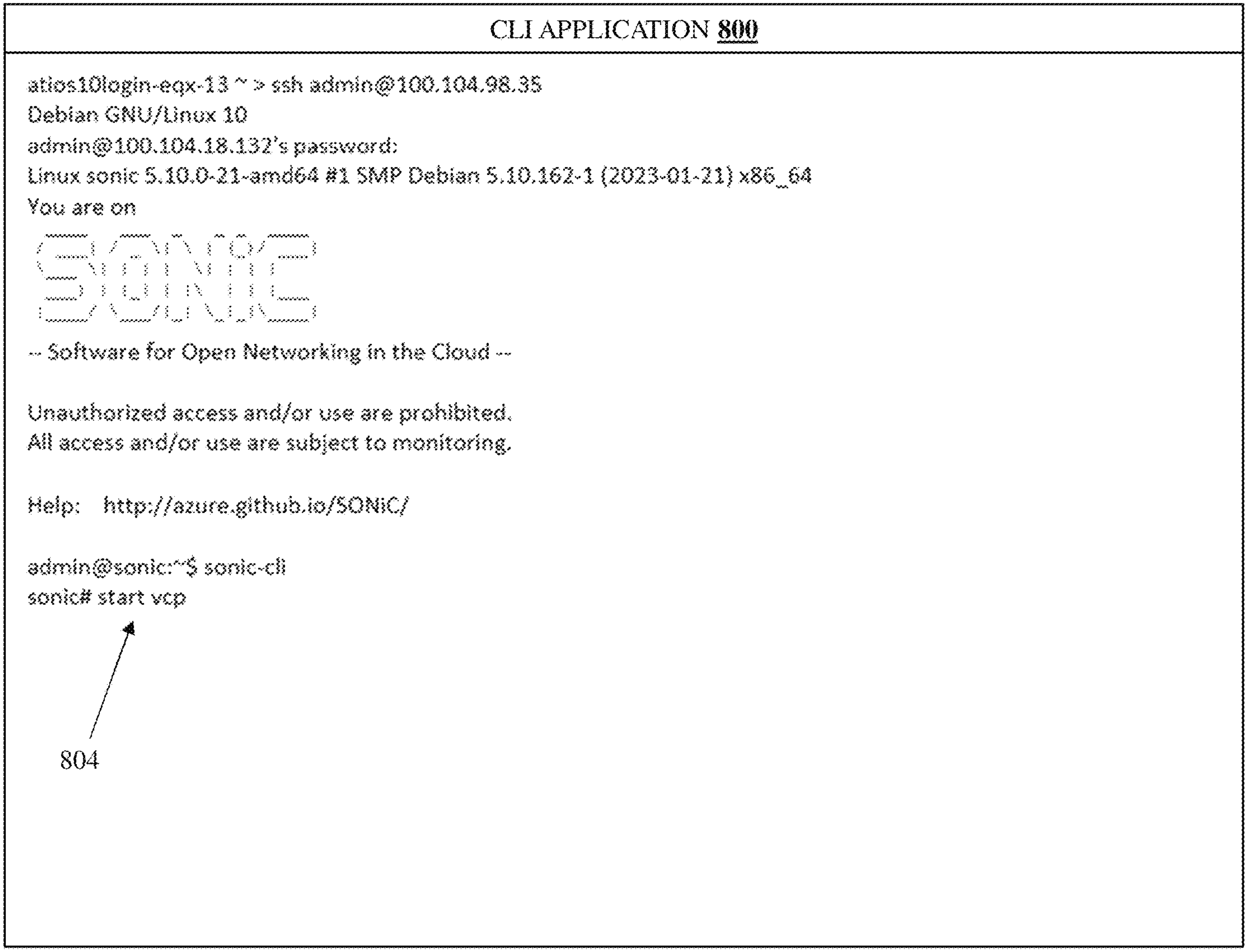
FIG. 8B is screenshot view illustrating an embodiment of a CLI application displayed on the management device in the networked system of FIG. 2 during the method of FIG. 4.
Figure 8C:
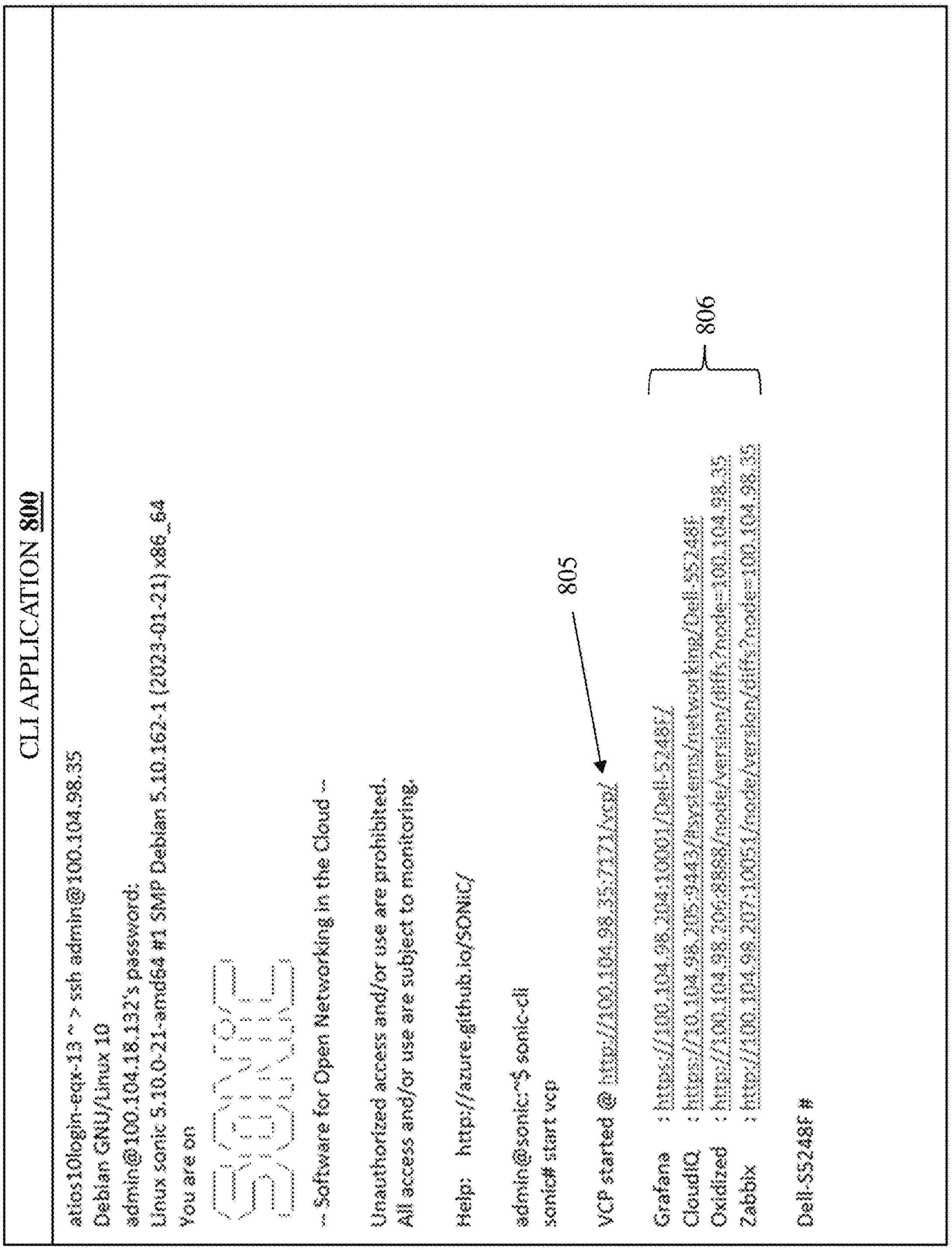
FIG. 8C is screenshot view illustrating an embodiment of a CLI application displayed on the management device in the networked system of FIG. 2 during the method of FIG. 4.

With reference to FIG. 8B, the user may then start the VCP sub-engine 304*b* described below by providing a VCP launch instruction 804 (e.g., "start VCP") in the CLI application 800. In response to providing the VCP launch instruction, the VCP sub-engine 304*b* may be initiated (e.g., by launching a VCP daemon) and may open a VCP Hyper Text Transfer Protocol (HTTP) server (e.g., at URL "100.104.98.35/7171/vcp/", with the port "7171" specific to the CLI session described above that was used to launch the VCP), as indicated by the VCP information 805 displayed on the CLI application 800 in FIG. 8C. In an embodiment, the VCP sub-engine 304*b* may access the VCP configuration information 600 in the networking database 306 to identify each of the external visualization applications that are accessible to it, and cause the CLI application 800 to display visualization application information 806 that identifies each external visualization application that is accessible to the VCP sub-engine 304*b* (e.g., the Grafana web analytics and monitoring application, the CloudIQ monitoring and analytics application, the Oxidized networking device configuration tool, and the Zabbix infrastructure monitoring tool in the illustrated example), along with corresponding URLs that allows those visualization applications to be accessed "natively" (i.e., as opposed to the access of visualizations provided by those visualization applications via the VCP application as described below).

Figure 9:
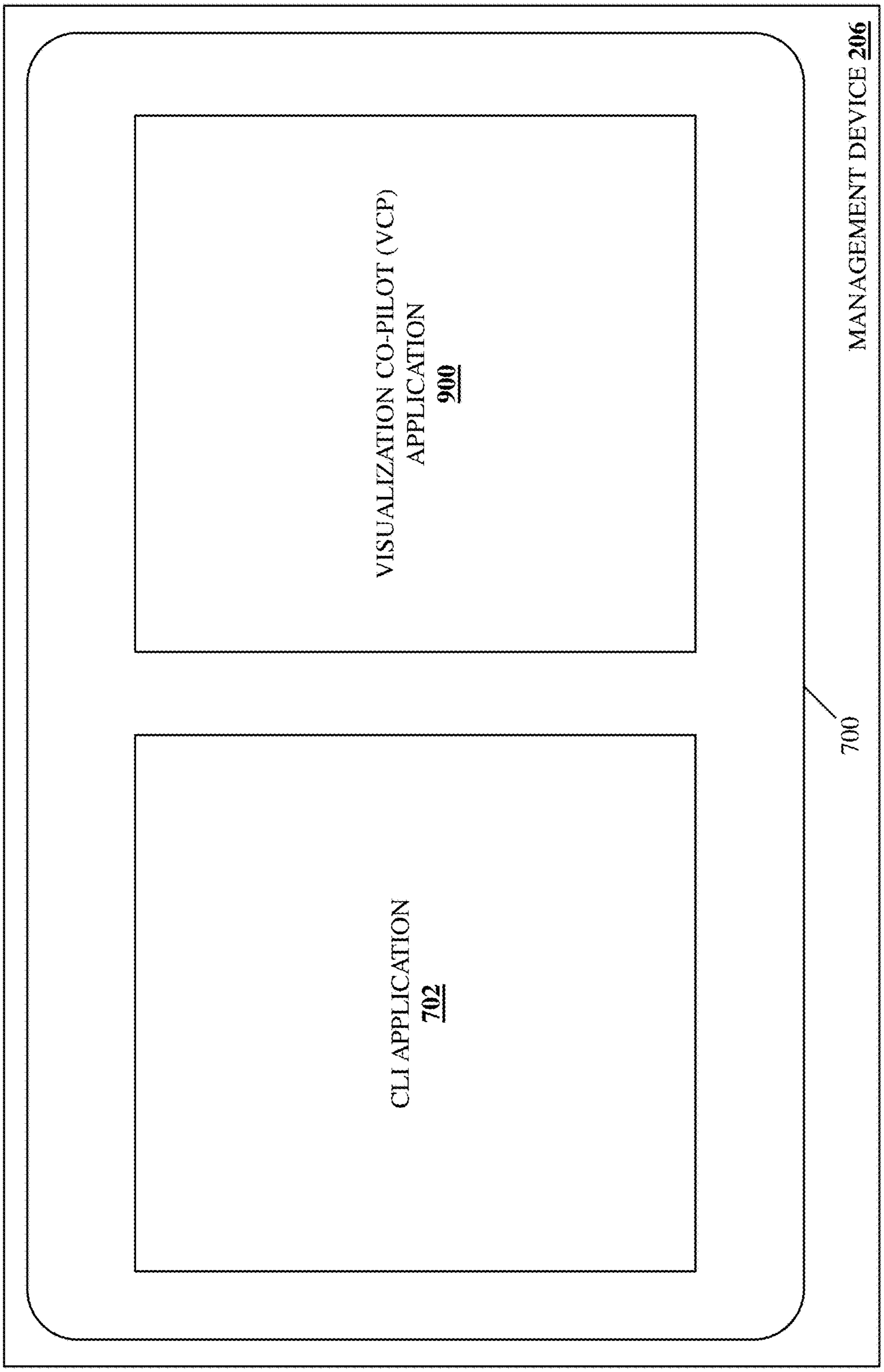
FIG. 9 is a screenshot view illustrating an embodiment of the management device in the networked system of FIG. 2 operating during the method of FIG. 4.

With reference to FIG. 9, in response to the user selecting the VCP information 805 described above with reference to FIG. 8C, the management device 206 may provide a VCP application 900 for display on its display device 700, and one of skill in the art in possession of the present disclosure will appreciate how the VCP application 900 and the CLI application 702 may be displayed side-by-side as illustrated in FIG. 9 in many examples. With reference to FIG. 10, an embodiment of a VCP application 1000 is illustrated that may provide the VCP application 900, and is illustrated providing an VCP information screen that one of skill in the art in possession of the present disclosure will appreciate identifies the networking device 202/300 for which it is provided, including details from the system Electronically Erasable Programmable Read-Only Memory (EEPROM) device for the networking device 202/300 (e.g., the service tag, serial number, etc. listed in FIG. 10). As will be appreciated by one of skill in the art in possession of the present disclosure, following block 403, the CLI session provided for the networking device 202/300 as described above may be mapped to a VCP session in which the VCP is provided (e.g., at the URL "100.104.98.35/7171/vcp/" as described for the example provided above).

The method 400 then proceeds to block 404 where a VCP subsystem in the computing device receives a CLI command, which was provided by a management device, from a CLI subsystem in the computing device. With reference back to FIGS. 3 and 9, in an embodiment of block 404 and as described in further detail in the examples provided below, a user of the management device 206 may provide CLI command(s) in the CLI application 702 to transmit the CLI command(s) via the network 204 and to the CLI sub-engine 304*a* in the networking engine 204 (i.e., via the communication system 310), and the CLI sub-engine 702 will share those CLI command(s) with the VCP sub-engine 304*b*. However, while a specific example of the CLI sub-engine 304*a* sharing CLI command(s) with the VCP sub-engine 304*b* is described, one of skill in the art in possession of the present disclosure will appreciate how the VCP sub-engine 304*b* may "snoop" CLI command(s) provided to the CLI sub-engine 304*a* using any of a variety of techniques while remaining within the scope of the present disclosure.

The method 400 then proceeds to block 406 where the VCP subsystem determines one or more visualization application(s) configured to generate a visualization associated with execution of a CLI command. With reference back to FIGS. 3 and 6, in an embodiment of block 406 and as described in further detail in the examples provided below, in response to receiving a CLI command the VCP sub-engine 304*b* may access the VCP configuration information 600 in the networking database 306 and identify visualization application(s) that are configured to generate a visualization associated with execution of the CLI command by determining which visualization information object(s) 602-610 (and corresponding visualization applications) include a CLI command key for that CLI command.

The method 400 then proceeds to block 408 where the VCP subsystem generates visualization access information using the CLI command and identifying information for the computing device. With reference back to FIGS. 3 and 6, in an embodiment of block 408 and as described in further detail in the examples provided below, in response to determining a visualization information object that include a CLI command key for a CLI command received at block 404, the VCP sub-engine 304*b* may access the URL template provided in the visualization information object for the CLI command key, and may perform parameter substitution on the URL template using identifying information from the networking device 202/300 (e.g., a "hostname" of the networking device 202/300 in the illustrated examples), at least one argument in the CLI command (e.g., a "start-time", "end-time" and "interface-list" in the illustrated examples), CLI session-specific attributes (e.g., the JSON Web Tokens (JWTs) in the illustrated examples that one of skill in the art in possession of the present disclosure will appreciate may be obtained using the Terminal Access Controller Access-Control System Plus (TACACS+) protocol during user login), and/or any other information that would be apparent to one of skill in the art in possession of the present disclosure. As described below, the parameter substitutions on the any URL described below generates a URL that provide an embodiment of the visualization access information of the present disclosure.

The method 400 then proceeds to block 410 where the VCP subsystem accesses at least one visualization generated by the one or more visualization application(s) using the visualization access information. With reference back to FIG. 3, in an embodiment of block 410 and as described in further detail in the examples provided below, the VCP sub-engine 304*b* may then use the visualization access information generated at block 408 (e.g., the URLs) to access at least one visualization generated by the one or more visualization applications.

The method 400 then proceeds to block 412 where the VCP subsystem provides the at least one visualization for display on the management device. With reference back to FIGS. 3 and 9, in an embodiment of block 412 and as described in further detail in the examples provided below, the VCP sub-engine 304*b* may then provide the at least one visualization accessed at block 410 via the network 204 and to the management device 206 such that it is displayed on the VCP application 900.

Figure 11A:
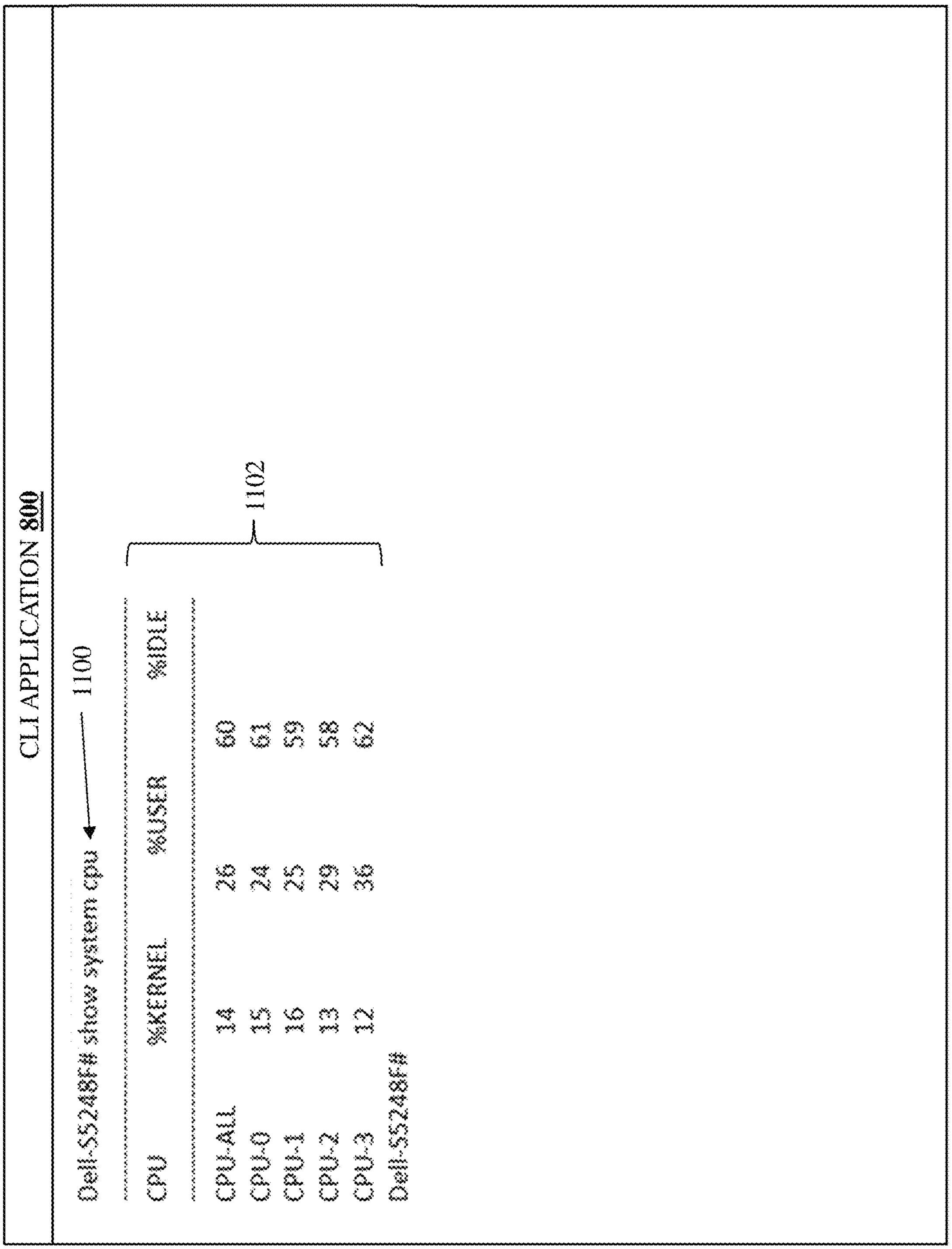
FIG. 11A is screenshot view illustrating an embodiment of a CLI application displayed on the management device of FIG. 9 during the method of FIG. 4.

With reference to FIGS. 3, 9, 11A, 11B, and 11C, a specific example of blocks 404-412 of the method 400 is illustrated and described. In an embodiment of block 404, a user of the management device 206 has provided a "show system cpu" CLI command 1100 in the CLI application 702/800 to transmit that CLI command via the network 204 and to the CLI sub-engine 304*a* in the networking engine 204 (i.e., via the communication system 310), and as described above the CLI sub-engine 702 will share that CLI command with the VCP sub-engine 304*b*. In addition, the CLI sub-engine 304*a* will execute the "show system cpu" CLI command 1100 to generate CLI response information, and as illustrated in FIG. 11A the CLI sub-engine 304*a* may transmit that CLI response information via the network 204 and to the management device 206 such that it displayed as a CLI response 1102 on the CLI application 702/800.

With reference to FIGS. 3 and 6, in an embodiment of block 406 and in response to receiving the CLI command, the VCP sub-engine 304*b* may access the VCP configuration information 600 in the networking database 306 and identify the Grafana web analytics and monitoring application and the CloudIQ monitoring and analytics application as the visualization applications that are configured to generate a visualization associated with execution of the CLI command by determining that the "show-system-cpu" CLI command key is included in the visualization information objects 602 and 604 for the Grafana web analytics and monitoring application and the CloudIQ monitoring and analytics application.

With reference back to FIGS. 3 and 6, in an embodiment of block 408, the VCP sub-engine 304*b* may then access the respective URL templates provided in the visualization information objects 602 and 604 for the "show-system-cpu" CLI command key, and may perform parameter substitution on those URL templates to generate URLs that provide an embodiment of the visualization access information of the present disclosure. In this example, that parameter substitution includes providing the "start-time" and "end-time" from the "show system cpu" CLI command 1100, the "hostname" of the networking device 202/300, and a "grafana-jwt-token" JWT for the Grafana web analytics and monitoring application in the URL template included in the visualization information object 602 for the "show-system-cpu" CLI command in order to provide a visualization access information URL for the "show system cpu" CLI command 1100. In this example, that parameter substitution also includes providing the "hostname" of the networking device 202/300 and a "cloudiq-jwt-token" JWT for the CloudIQ monitoring and analytics application in the URL template included in the visualization information object 604 for the "show-system-cpu" CLI command in order to provide a visualization access information URL for the "show system cpu" CLI command 1100.

Figure 11B:
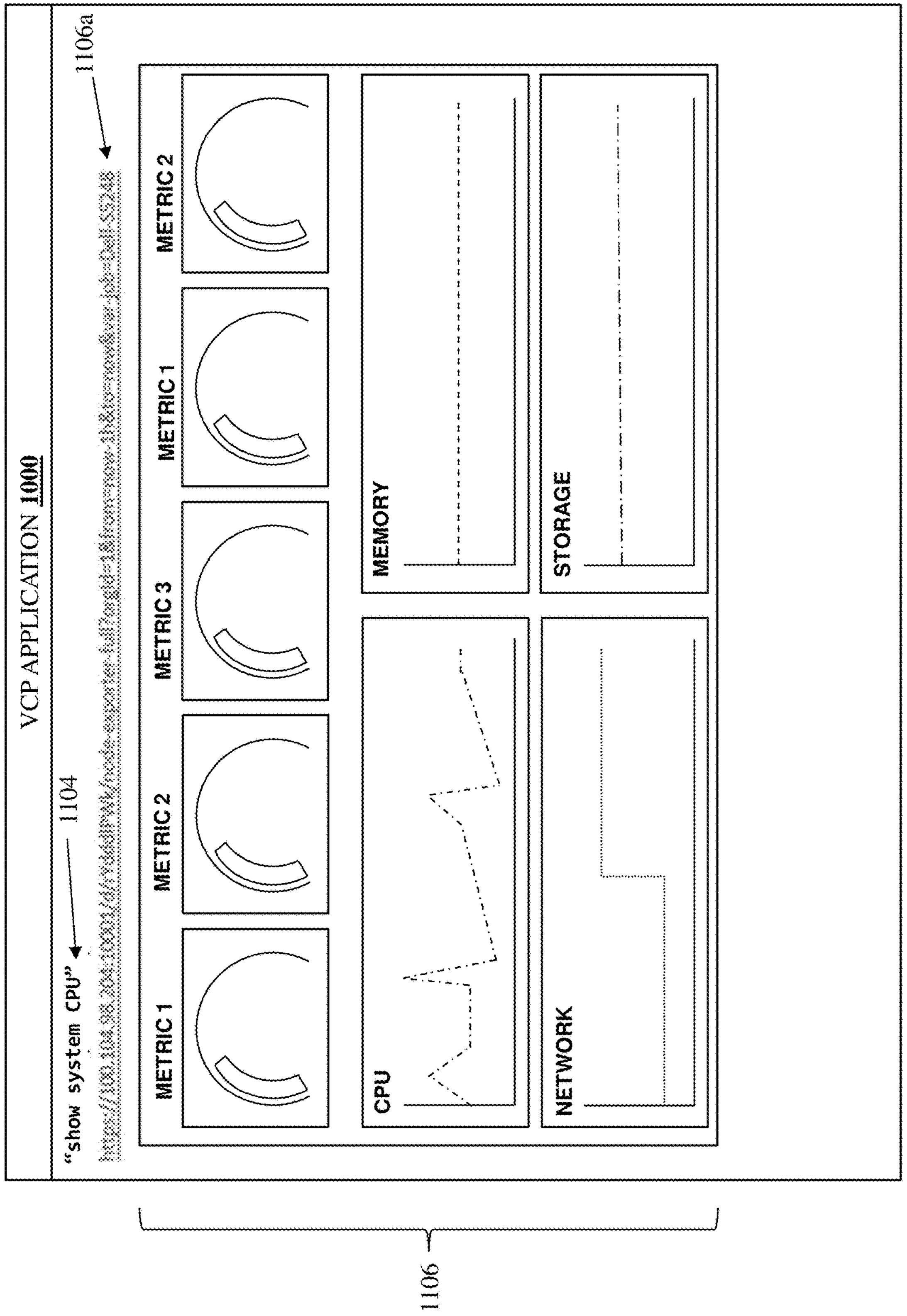
FIG. 11B is screenshot view illustrating an embodiment of a VCP application displayed on the management device of FIG. 9 during the method of FIG. 4.

With reference back to FIGS. 3, 9, 11B, and 11C, in an embodiment of blocks 410 and 412, the VCP sub-engine 304*b* may then use the visualization access information URLs generated at block 408 to access visualizations generated by the Grafana web analytics and monitoring application and the CloudIQ monitoring and analytics application, and then provide those visualizations via the network 204 and to the management device 206 such that it is displayed on the VCP application 900. As can be seen in FIG. 11B, the VCP sub-engine 304*b* may cause the VCP application 900/100 to display a "show system cpu" CLI command 1104 that corresponds to the "show system cpu" command 1100 provided on the CLI application 702/800, a visualization 1106 that one of skill in the art in possession of the present disclosure will appreciate may be provided by any visualizations generated by the Grafana web analytics and monitoring application (e.g., a Grafana "dashboard", "panel", "screen", etc.) that may be mapped to the "show-system-cpu" CLI command key via the URL template and resulting URL discussed above, and a native visualization link 1106*a* that may be selected by the user to access the visualization 1106 natively in the Grafana web analytics and monitoring application. As will be appreciated by one of skill in the art in possession of the present disclosure, the visualization 1106 provided in the VCP application 1000 in FIG. 11B is conventionally accessed natively via the selection of multiple GUI-based buttons, tabs, and/or other elements in the Grafana web analytics and monitoring application, but may be provided in the VCP application 1000 automatically in response to the provisioning of the "show system cpu" command 1100 on the CLI application 702/800.

Figure 11C:
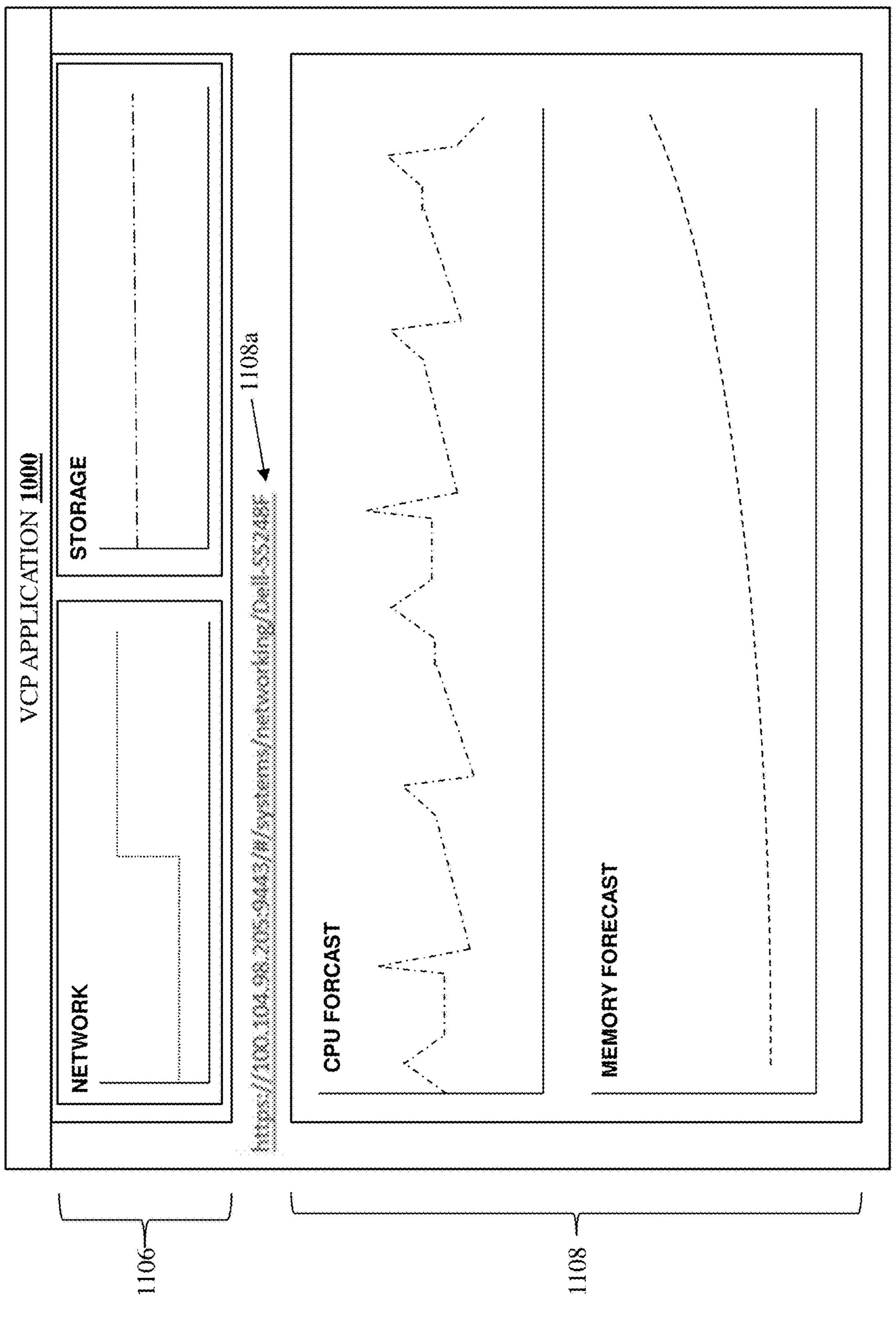
FIG. 11C is screenshot view illustrating an embodiment of a VCP application displayed on the management device of FIG. 9 during the method of FIG. 4.

As can be seen in FIG. 11C, the VCP sub-engine 304*b* may also cause the VCP application 900/100 to display a visualization 1108 that one of skill in the art in possession of the present disclosure will appreciate may be provided by any visualizations generated by the CloudIQ monitoring and analytics application that may be mapped to the "show-system-cpu" CLI command key via the URL template and resulting URL discussed above, and a native visualization link 1108*a* that may be selected by the user to access the visualization 1108 natively in the CloudIQ monitoring and analytics application. As will be appreciated by one of skill in the art in possession of the present disclosure, the visualization 1108 provided in the VCP application 1000 in FIG. 11C is conventionally accessed natively via the selection of multiple GUI-based buttons, tabs, and/or other elements in the CloudIQ monitoring and analytics application, but may be provided in the VCP application 1000 automatically in response to the provisioning of the "show system cpu" command 1100 on the CLI application 702/800.

In some examples, the VCP sub-engine 304*b* may use the visualization access information URLs described above to retrieve the visualizations 1106 and 1108 from the Grafana web analytics and monitoring application and the CloudIQ monitoring and analytics application, respectively, and then provide (e.g., append) those visualizations in the VCP application 900/1000 as described above. However, in other examples, the VCP sub-engine 304*b* may "embed" the visualization access information URLs from the Grafana web analytics and monitoring application and the CloudIQ monitoring and analytics application, respectively, in the VCP application 900/1000 in order to provide the visualizations 1106 and 1108 in the VCP application 900/1000 as described above. In either situation, one of skill in the art in possession of the present disclosure how the visualizations 1106 and 1108 may dynamically update (or be dynamically updated) while the CLI response 1102 provided on the CLI application 702/800 may remain static (i.e., the CLI response 1102 provides CLI response information retrieved at the time the "show system cpu" CLI command 1100 was received, while the visualizations 1106 and 1108 may continue to update following the receiving of the "show system cpu" CLI command 1100).

Figure 12B:
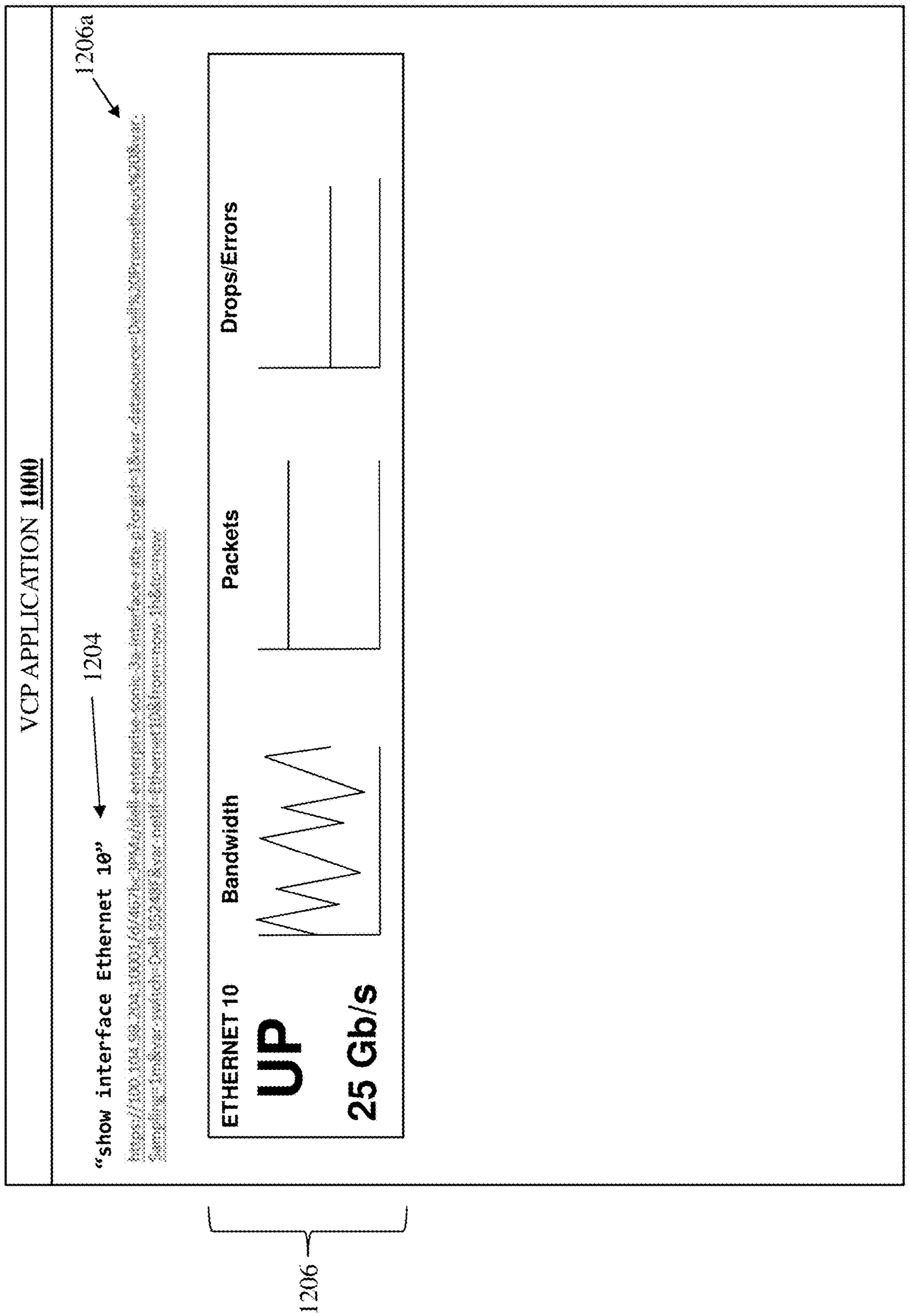
FIG. 12B is screenshot view illustrating an embodiment of a VCP application displayed on the management device of FIG. 9 during the method of FIG. 4.

With reference to FIGS. 3, 9, 12A and 12B, another specific example of blocks 404-412 of the method 400 is illustrated and described. In an embodiment of block 404, a user of the management device 206 has provided a "show interface Ethernet 10" CLI command 1200 in the CLI application 702/800 to transmit that CLI command via the network 204 and to the CLI sub-engine 304*a* in the networking engine 204 (i.e., via the communication system 310), and as described above the CLI sub-engine 702 will share that CLI command with the VCP sub-engine 304*b*. In addition, the CLI sub-engine 304*a* will execute the "show interface Ethernet 10" CLI command 1200 to generate CLI response information, and as illustrated in FIG. 12A the CLI sub-engine 304*a* may transmit that CLI response information via the network 204 and to the management device 206 such that it displayed as a CLI response 1202 on the CLI application 702/800.

With reference to FIGS. 3 and 6, in an embodiment of block 406 and in response to receiving the CLI command, the VCP sub-engine 304*b* may access the VCP configuration information 600 in the networking database 306 and identify the Grafana web analytics and monitoring application as the visualization application that is configured to generate a visualization associated with execution of the CLI command by determining that the "show-interface-ethernet" CLI command key is included in the visualization information object 602 for the Grafana web analytics and monitoring application.

With reference back to FIGS. 3 and 6, in an embodiment of block 408, the VCP sub-engine 304*b* may then access the URL template provided in the visualization information object 602 for the "show-interface-ethernet" CLI command key, and may perform parameter substitution on that URL template to generate a URL that provides an embodiment of the visualization access information of the present disclosure. In this example, that parameter substitution includes providing the "interface-list" from the "show interface Ethernet 10" CLI command 1200, the "hostname" of the networking device 202/300, and a "grafana-jwt-token" JWT for the Grafana web analytics and monitoring application in the URL template included in the visualization information object 602 for the "show-interface-ethernet" CLI command in order to provide a visualization access information URL for the "show interface Ethernet 10" CLI command 1200.

With reference back to FIGS. 3, 9, and 12B, in an embodiment of blocks 410 and 412, the VCP sub-engine 304*b* may then use the visualization access information URL generated at block 408 to access a visualization generated by the Grafana web analytics and monitoring application, and then provide that visualization via the network 204 and to the management device 206 such that it is displayed on the VCP application 900. As can be seen in FIG. 12B, the VCP sub-engine 304*b* may cause the VCP application 900/100 to display a "show interface Ethernet 10" CLI command 1204 that corresponds to the "show interface Ethernet 10" CLI command 1200 provided on the CLI application 702/800, a visualization 1206 that one of skill in the art in possession of the present disclosure will appreciate may be provided by any visualizations generated by the Grafana web analytics and monitoring application (e.g., a Grafana "dashboard", "panel", "screen", etc.) that may be mapped to the "show-interface-ethernet" CLI command key via the URL template and resulting URL discussed above, and a native visualization link 1206*a* that may be selected by the user to access the visualization 1206 natively in the Grafana web analytics and monitoring application. As will be appreciated by one of skill in the art in possession of the present disclosure, the visualization 1206 provided in the VCP application 1000 in FIG. 12B is conventionally accessed natively via the selection of multiple GUI-based buttons, tabs, and/or other elements in the Grafana web analytics and monitoring application, but may be provided in the VCP application 1000 automatically in response to the provisioning of the "show interface Ethernet 10" CLI command 1204 on the CLI application 702/800.

In some examples, the VCP sub-engine 304*b* may use the visualization access information URLs described above to retrieve the visualization 1206 from the Grafana web analytics and monitoring application, and then provide (e.g., append) that visualization in the VCP application 900/1000 as described above. However, in other examples, the VCP sub-engine 304*b* may "embed" the visualization access information URL from the Grafana web analytics and monitoring application in the VCP application 900/1000 in order to provide the visualization 1206 in the VCP application 900/1000 as described above. In either situation, one of skill in the art in possession of the present disclosure how the visualization 1206 may dynamically update (or be dynamically updated) while the CLI response 1202 provided on the CLI application 702/800 may remain static (i.e., the CLI response 1202 provides CLI response information retrieved at the time the "show interface Ethernet 10" CLI command 1200 was received, while the visualization 1206 may continue to update following the receiving of the "show interface Ethernet 10" CLI command 1200).

Figure 13B:
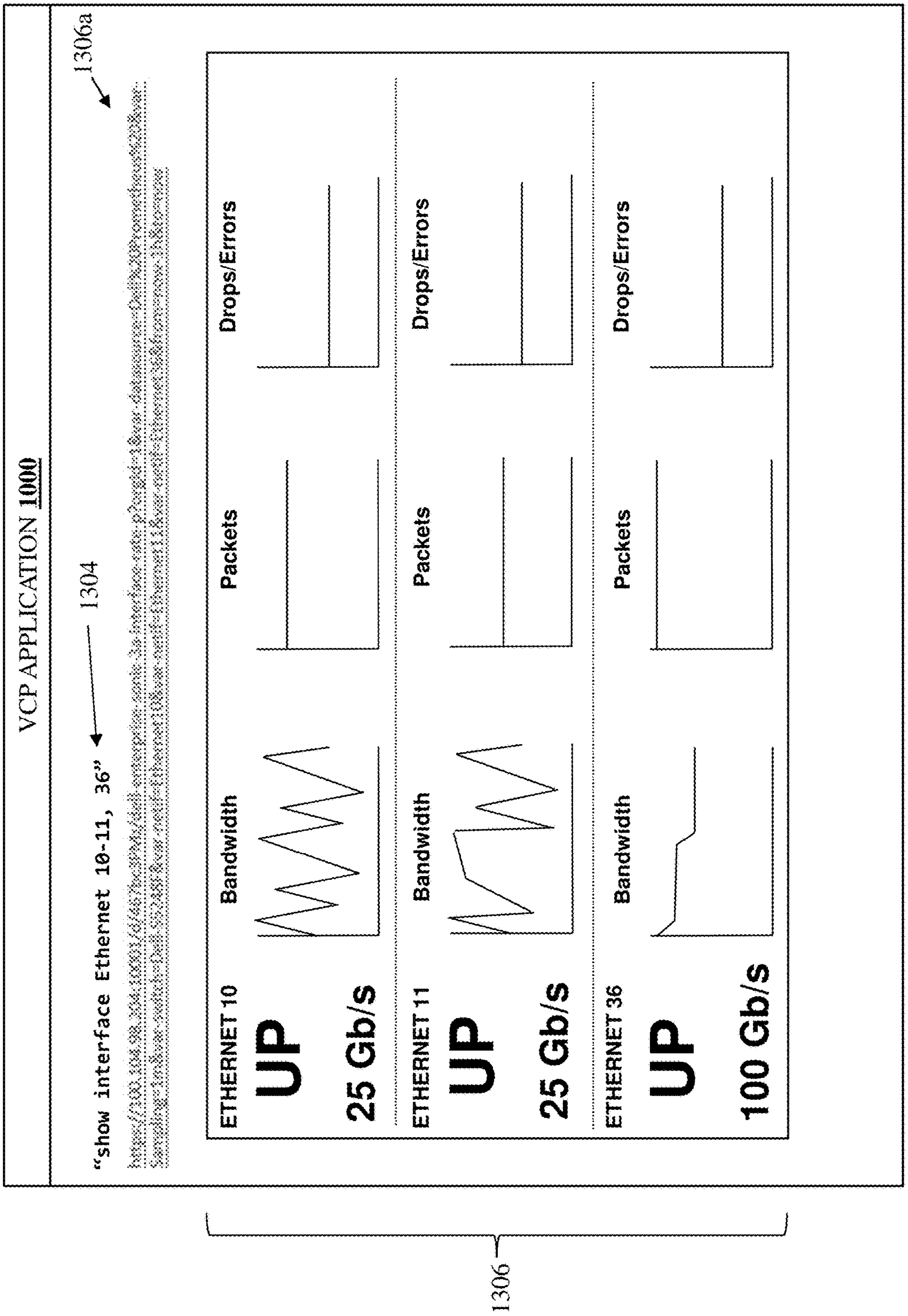
FIG. 13B is screenshot view illustrating an embodiment of a VCP application displayed on the management device of FIG. 9 during the method of FIG. 4.

With reference to FIGS. 3, 9, 13A and 13B, another specific example of blocks 404-412 of the method 400 is illustrated and described. In an embodiment of block 404, a user of the management device 206 has provided a "show interface Ethernet 10-11, 36" CLI command 1300 in the CLI application 702/800 to transmit that CLI command via the network 204 and to the CLI sub-engine 304*a* in the networking engine 204 (i.e., via the communication system 310), and as described above the CLI sub-engine 702 will share that CLI command with the VCP sub-engine 304*b*. In addition, the CLI sub-engine 304*a* will execute the "show interface Ethernet 10-11, 36" CLI command 1300 to generate CLI response information, and as illustrated in FIG. 13A the CLI sub-engine 304*a* may transmit that CLI response information via the network 204 and to the management device 206 such that it displayed as a CLI response 1302 on the CLI application 702/800.

With reference to FIGS. 3 and 6, in an embodiment of block 406 and in response to receiving the CLI command, the VCP sub-engine 304*b* may access the VCP configuration information 600 in the networking database 306 and identify the Grafana web analytics and monitoring application as the visualization application that is configured to generate a visualization associated with execution of the CLI command by determining that the "show-interface-ethernet" CLI command key is included in the visualization information object 602 for the Grafana web analytics and monitoring application.

With reference back to FIGS. 3 and 6, in an embodiment of block 408, the VCP sub-engine 304*b* may then access the URL template provided in the visualization information object 602 for the "show-interface-ethernet" CLI command key, and may perform parameter substitution on that URL template to generate a URL that provides an embodiment of the visualization access information of the present disclosure. In this example, that parameter substitution includes providing the "interface-list" from the "show interface Ethernet 10-11, 36" CLI command 1300, the "hostname" of the networking device 202/300, and a "grafana-jwt-token" JWT for the Grafana web analytics and monitoring application in the URL template included in the visualization information object 602 for the "show-interface-ethernet" CLI command in order to provide a visualization access information URL for the "show interface Ethernet 10-11, 36" CLI command 1300.

With reference back to FIGS. 3, 9, and 13B, in an embodiment of blocks 410 and 412, the VCP sub-engine 304*b* may then use the visualization access information URL generated at block 408 to access a visualization generated by the Grafana web analytics and monitoring application, and then provide that visualization via the network 204 and to the management device 206 such that it is displayed on the VCP application 900. As can be seen in FIG. 13B, the VCP sub-engine 304*b* may cause the VCP application 900/100 to display a "show interface Ethernet 10-11, 36" CLI command 1304 that corresponds to the "show interface Ethernet 10-11, 36" CLI command 1300 provided on the CLI application 702/800, a visualization 1306 that one of skill in the art in possession of the present disclosure will appreciate may be provided by any visualizations generated by the Grafana web analytics and monitoring application (e.g., a Grafana "dashboard", "panel", "screen", etc.) that may be mapped to the "show-interface-ethernet" CLI command key via the URL template and resulting URL discussed above, and a native visualization link 1306*a* that may be selected by the user to access the visualization 1306 natively in the Grafana web analytics and monitoring application. As will be appreciated by one of skill in the art in possession of the present disclosure, the visualization 1306 provided in the VCP application 1000 in FIG. 13B is conventionally accessed natively via the selection of multiple GUI-based buttons, tabs, and/or other elements in the Grafana web analytics and monitoring application, but may be provided in the VCP application 1000 automatically in response to the provisioning of the "show interface Ethernet 10-11, 36" CLI command 1300 on the CLI application 702/800.

In some examples, the VCP sub-engine 304*b* may use the visualization access information URLs described above to retrieve the visualization 1306 from the Grafana web analytics and monitoring application, and then provide (e.g., append) that visualization in the VCP application 900/1000 as described above. However, in other examples, the VCP sub-engine 304*b* may "embed" the visualization access information URL from the Grafana web analytics and monitoring application in the VCP application 900/1000 in order to provide the visualization 1306 in the VCP application 900/1000 as described above. In either situation, one of skill in the art in possession of the present disclosure how the visualization 1306 may dynamically update (or be dynamically updated) while the CLI response 1302 provided on the CLI application 702/800 may remain static (i.e., the CLI response 1302 provides CLI response information retrieved at the time the "show interface Ethernet 10-11, 36" CLI command 1300 was received, while the visualization 1306 may continue to update following the receiving of the "show interface Ethernet 10-11, 36" CLI command 1300).

Figure 14B:
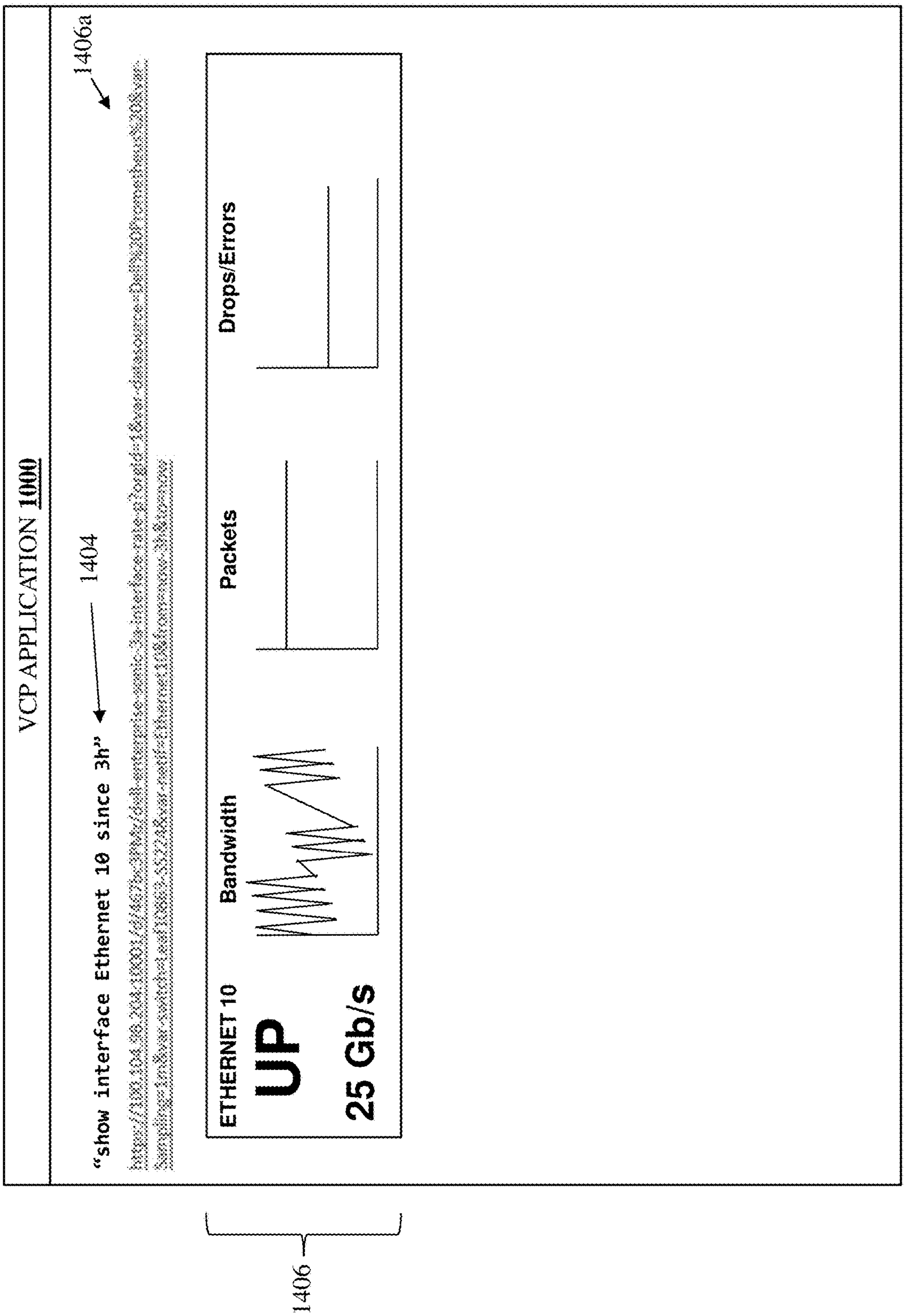
FIG. 14B is screenshot view illustrating an embodiment of a VCP application displayed on the management device of FIG. 9 during the method of FIG. 4.

With reference to FIGS. 3, 9, 14A and 14B, another specific example of blocks 404-412 of the method 400 is illustrated and described. In an embodiment of block 404, a user of the management device 206 has provided a "show interface Ethernet10 since 3h" CLI command 1400 in the CLI application 702/800 to transmit that CLI command via the network 204 and to the CLI sub-engine 304*a* in the networking engine 204 (i.e., via the communication system 310), and as described above the CLI sub-engine 702 will share that CLI command with the VCP sub-engine 304*b*. In addition, the CLI sub-engine 304*a* will execute the "show interface Ethernet10 since 3h" CLI command 1400 to generate CLI response information, and as illustrated in FIG. 14A the CLI sub-engine 304*a* may transmit that CLI response information via the network 204 and to the management device 206 such that it displayed as a CLI response 1402 on the CLI application 702/800.

With reference to FIGS. 3 and 6, in an embodiment of block 406 and in response to receiving the CLI command, the VCP sub-engine 304*b* may access the VCP configuration information 600 in the networking database 306 and identify the Grafana web analytics and monitoring application as the visualization application that is configured to generate a visualization associated with execution of the CLI command by determining that the "show-interface-ethernet" CLI command key is included in the visualization information object 602 for the Grafana web analytics and monitoring application.

With reference back to FIGS. 3 and 6, in an embodiment of block 408, the VCP sub-engine 304*b* may then access the URL template provided in the visualization information object 602 for the "show-interface-ethernet" CLI command key, and may perform parameter substitution on that URL template to generate a URL that provides an embodiment of the visualization access information of the present disclosure. In this example, that parameter substitution includes providing the "interface-list" from the "show interface Ethernet10 since 3h" CLI command 1400, the "hostname" of the networking device 202/300, and a "grafana-jwt-token" JWT for the Grafana web analytics and monitoring application in the URL template included in the visualization information object 602 for the "show-interface-ethernet" CLI command in order to provide a visualization access information URL for the "show interface Ethernet10 since 3h" CLI command 1400.

With reference back to FIGS. 3, 9, and 14B, in an embodiment of blocks 410 and 412, the VCP sub-engine 304*b* may then use the visualization access information URL generated at block 408 to access a visualization generated by the Grafana web analytics and monitoring application, and then provide that visualization via the network 204 and to the management device 206 such that it is displayed on the VCP application 900. As can be seen in FIG. 14B, the VCP sub-engine 304*b* may cause the VCP application 900/100 to display a "show interface Ether Ethernet10 since 3h" CLI command 1404 that corresponds to the "show interface Ethernet10 since 3h" CLI command 1400 provided on the CLI application 702/800, a visualization 1406 that one of skill in the art in possession of the present disclosure will appreciate may be provided by any visualizations generated by the Grafana web analytics and monitoring application (e.g., a Grafana "dashboard", "panel", "screen", etc.) that may be mapped to the "show-interface-ethernet" CLI command key via the URL template and resulting URL discussed above, and a native visualization link 1406*a* that may be selected by the user to access the visualization 1406 natively in the Grafana web analytics and monitoring application. As will be appreciated by one of skill in the art in possession of the present disclosure, the visualization 1406 provided in the VCP application 1000 in FIG. 14B is conventionally accessed natively via the selection of multiple GUI-based buttons, tabs, and/or other elements in the Grafana web analytics and monitoring application, but may be provided in the VCP application 1000 automatically in response to the provisioning of the "show interface Ethernet10 since 3h" CLI command 1400 on the CLI application 702/800.

In some examples, the VCP sub-engine 304*b* may use the visualization access information URLs described above to retrieve the visualization 1406 from the Grafana web analytics and monitoring application, and then provide (e.g., append) that visualization in the VCP application 900/1000 as described above. However, in other examples, the VCP sub-engine 304*b* may "embed" the visualization access information URL from the Grafana web analytics and monitoring application in the VCP application 900/1000 in order to provide the visualization 1406 in the VCP application 900/1000 as described above. In either situation, one of skill in the art in possession of the present disclosure how the visualization 1406 may dynamically update (or be dynamically updated) while the CLI response 1402 provided on the CLI application 702/800 may remain static (i.e., the CLI response 1402 provides CLI response information retrieved at the time the "show interface Ethernet10 since 3h" CLI command 1400 was received, while the visualization 1406 may continue to update following the receiving of the "show interface Ethernet10 since 3h" CLI command 1400).

Figure 15B:
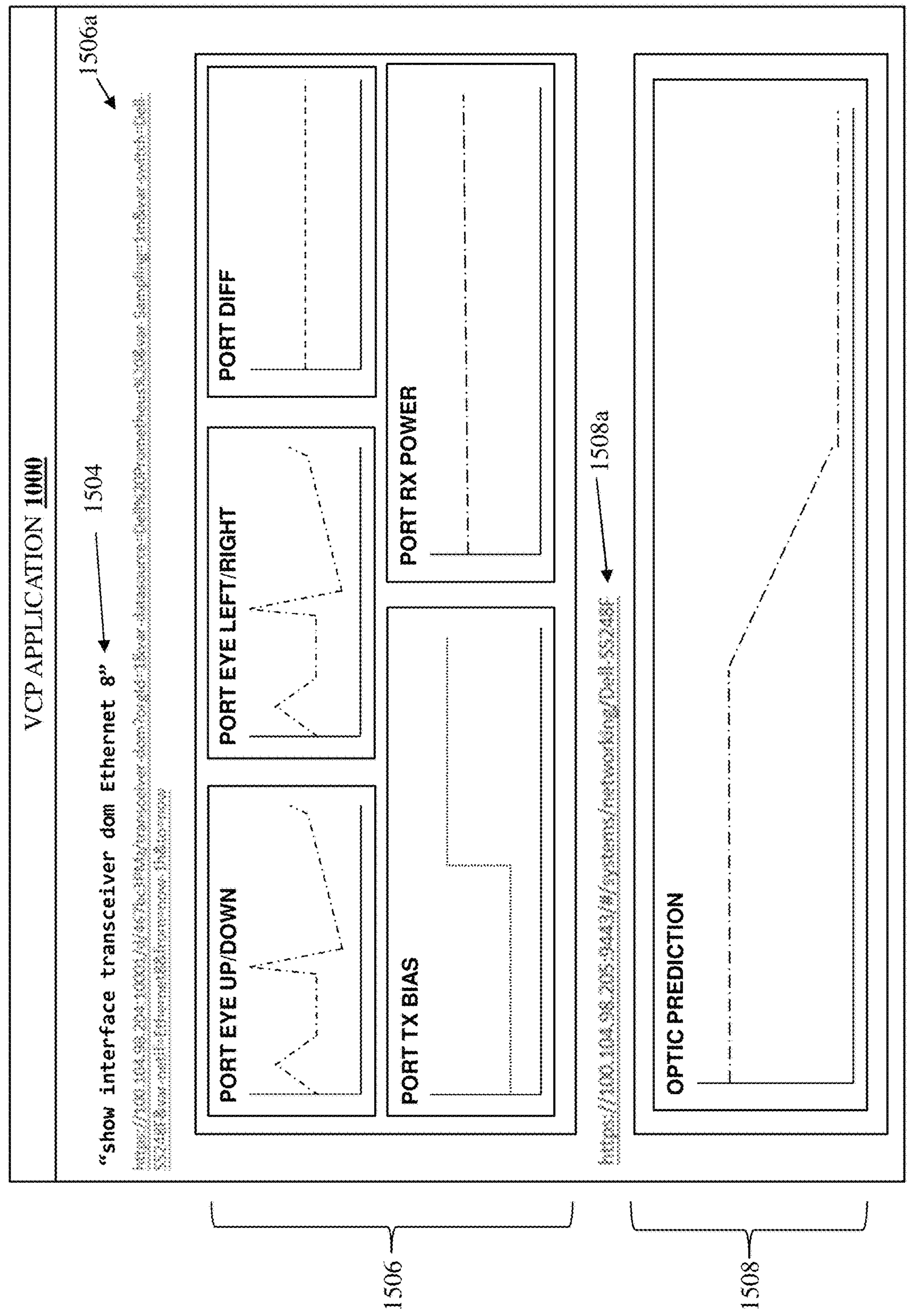
FIG. 15B is screenshot view illustrating an embodiment of a VCP application displayed on the management device of FIG. 9 during the method of FIG. 4.

With reference to FIGS. 3, 9, 15A, and 15B, another specific example of blocks 404-412 of the method 400 is illustrated and described. In an embodiment of block 404, a user of the management device 206 has provided a "show interface transceiver dom Ethernet8" CLI command 1500 in the CLI application 702/800 to transmit that CLI command via the network 204 and to the CLI sub-engine 304*a* in the networking engine 204 (i.e., via the communication system 310), and as described above the CLI sub-engine 702 will share that CLI command with the VCP sub-engine 304*b*. In addition, the CLI sub-engine 304*a* will execute the "show interface transceiver dom Ethernet8" CLI command 1500 to generate CLI response information, and as illustrated in FIG. 15A the CLI sub-engine 304*a* may transmit that CLI response information via the network 204 and to the management device 206 such that it displayed as a CLI response 1502 on the CLI application 702/800.

With reference to FIGS. 3 and 6, in an embodiment of block 406 and in response to receiving the CLI command, the VCP sub-engine 304*b* may access the VCP configuration information 600 in the networking database 306 and identify the Grafana web analytics and monitoring application and the CloudIQ monitoring and analytics application as the visualization applications that are configured to generate a visualization associated with execution of the CLI command by determining that the "show-interface-transceiver-dom" CLI command key is included in the visualization information objects 602 and 604 for the Grafana web analytics and monitoring application and the CloudIQ monitoring and analytics application.

With reference back to FIGS. 3 and 6, in an embodiment of block 408, the VCP sub-engine 304*b* may then access the respective URL templates provided in the visualization information objects 602 and 604 for the "show-interface-transceiver-dom" CLI command key, and may perform parameter substitution on those URL templates to generate URLs that provide an embodiment of the visualization access information of the present disclosure. In this example, that parameter substitution includes providing the "start-time", "end-time", and "interface-list" from the "show interface transceiver dom Ethernet8" CLI command 1500, the "hostname" of the networking device 202/300, and a "grafana-jwt-token" JWT for the Grafana web analytics and monitoring application in the URL template included in the visualization information object 602 for the "show-interface-transceiver-dom" CLI command in order to provide a visualization access information URL for the "show interface transceiver dom Ethernet8" CLI command 1500. In this example, that parameter substitution also includes providing the "interface-list" from the "show interface transceiver dom Ethernet8" CLI command 1500, the "hostname" of the networking device 202/300, and a "cloudiq-jwt-token" JWT for the CloudIQ monitoring and analytics application in the URL template included in the visualization information object 604 for the "show-interface-transceiver-dom" CLI command in order to provide a visualization access information URL for the "show interface transceiver dom Ethernet8" CLI command 1500.

With reference back to FIGS. 3, 9, and 15B, in an embodiment of blocks 410 and 412, the VCP sub-engine 304*b* may then use the visualization access information URLs generated at block 408 to access visualizations generated by the Grafana web analytics and monitoring application and the CloudIQ monitoring and analytics application, and then provide those visualizations via the network 204 and to the management device 206 such that it is displayed on the VCP application 900. As can be seen in FIG. 15B, the VCP sub-engine 304*b* may cause the VCP application 900/100 to display a "show interface transceiver dom Ethernet8" CLI command 1504 that corresponds to the "show interface transceiver dom Ethernet8" command 1500 provided on the CLI application 702/800, a visualization 1506 that one of skill in the art in possession of the present disclosure will appreciate may be provided by any visualizations generated by the Grafana web analytics and monitoring application (e.g., a Grafana "dashboard", "panel", "screen", etc.) that may be mapped to the "show-system-cpu" CLI command key via the URL template and resulting URL discussed above, and a native visualization link 1506*a* that may be selected by the user to access the visualization 1506 natively in the Grafana web analytics and monitoring application. As will be appreciated by one of skill in the art in possession of the present disclosure, the visualization 1506 provided in the VCP application 1000 in FIG. 15B is conventionally accessed natively via the selection of multiple GUI-based buttons, tabs, and/or other elements in the Grafana web analytics and monitoring application, but may be provided in the VCP application 1000 automatically in response to the provisioning of the "show interface transceiver dom Ethernet8" command 1500 on the CLI application 702/800.

As can also be seen in FIG. 15*b*, the VCP sub-engine 304*b* may also cause the VCP application 900/100 to display a visualization 1508 that one of skill in the art in possession of the present disclosure will appreciate may be provided by any visualizations generated by the CloudIQ monitoring and analytics application that may be mapped to the "show-system-cpu" CLI command key via the URL template and resulting URL discussed above, and a native visualization link 1508*a* that may be selected by the user to access the visualization 1508 natively in the CloudIQ monitoring and analytics application. As will be appreciated by one of skill in the art in possession of the present disclosure, the visualization 1508 provided in the VCP application 1000 in FIG.

15B is conventionally accessed natively via the selection of multiple GUI-based buttons, tabs, and/or other elements in the CloudIQ monitoring and analytics application, but may be provided in the VCP application 1000 automatically in response to the provisioning of the "show interface transceiver dom Ethernet8" command 1500 on the CLI application 702/800.

In some examples, the VCP sub-engine 304*b* may use the visualization access information URLs described above to retrieve the visualizations 1506 and 1508 from the Grafana web analytics and monitoring application and the CloudIQ monitoring and analytics application, respectively, and then provide (e.g., append) those visualizations in the VCP application 900/1000 as described above. However, in other examples, the VCP sub-engine 304*b* may "embed" the visualization access information URLs from the Grafana web analytics and monitoring application and the CloudIQ monitoring and analytics application, respectively, in the VCP application 900/1000 in order to provide the visualizations 1506 and 1508 in the VCP application 900/1000 as described above. In either situation, one of skill in the art in possession of the present disclosure how the visualizations 1506 and 1508 may dynamically update (or be dynamically updated) while the CLI response 1502 provided on the CLI application 702/800 may remain static (i.e., the CLI response 1502 provides CLI response information retrieved at the time the "show interface transceiver dom Ethernet8" CLI command 1500 was received, while the visualizations 1506 and 1508 may continue to update following the receiving of the "show interface transceiver dom Ethernet8" CLI command 1500).

Figure 16B:
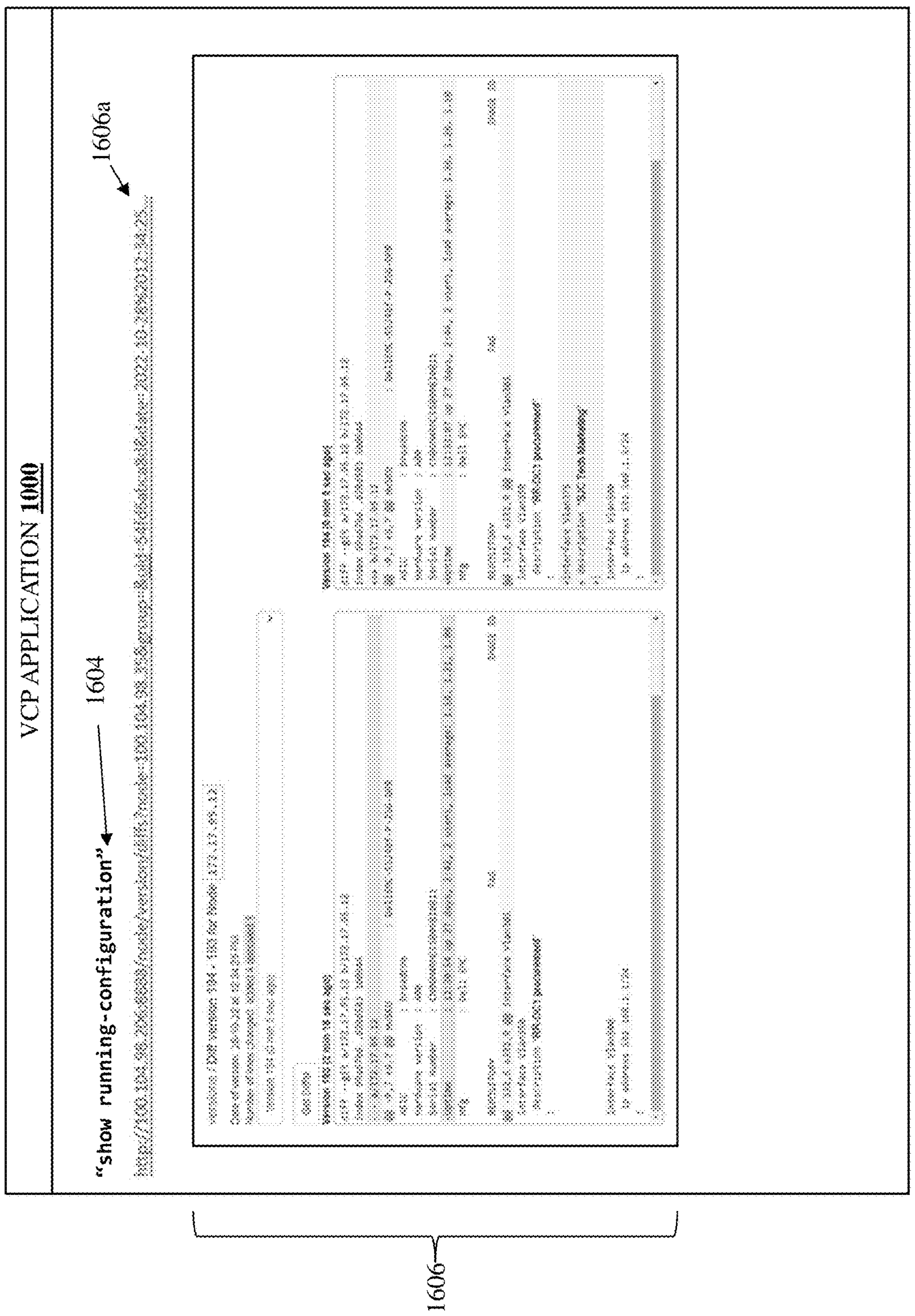
FIG. 16B is screenshot view illustrating an embodiment of a VCP application displayed on the management device of FIG. 9 during the method of FIG. 4.

With reference to FIGS. 3, 9, 16A and 16B, another specific example of blocks 404-412 of the method 400 is illustrated and described. In an embodiment of block 404, a user of the management device 206 has provided a "show running-configuration" CLI command 1600 in the CLI application 702/800 to transmit that CLI command via the network 204 and to the CLI sub-engine 304*a* in the networking engine 204 (i.e., via the communication system 310), and as described above the CLI sub-engine 702 will share that CLI command with the VCP sub-engine 304*b*. In addition, the CLI sub-engine 304*a* will execute the "show running-configuration" CLI command 1600 to generate CLI response information, and as illustrated in FIG. 16A the CLI sub-engine 304*a* may transmit that CLI response information via the network 204 and to the management device 206 such that it displayed as a CLI response 1602 on the CLI application 702/800.

With reference to FIGS. 3 and 6, in an embodiment of block 406 and in response to receiving the CLI command, the VCP sub-engine 304*b* may access the VCP configuration information 600 in the networking database 306 and identify the Oxidized networking device configuration tool as the visualization application that is configured to generate a visualization associated with execution of the CLI command by determining that the "show-running-configuration" CLI command key is included in the visualization information object 606 for the Oxidized networking device configuration tool.

With reference back to FIGS. 3 and 6, in an embodiment of block 408, the VCP sub-engine 304*b* may then access the URL template provided in the visualization information object 602 for the "show-running-configuration" CLI command key, and may perform parameter substitution on that URL template to generate a URL that provides an embodiment of the visualization access information of the present disclosure. In this example, that parameter substitution includes providing the "start-time" and "end-time" from the "show running-configuration" CLI command 1600 and the "hostname" of the networking device 202/300 in the URL template included in the visualization information object 606 for the "show-running-configuration" CLI command in order to provide a visualization access information URL for the "show running-configuration" CLI command 1600.

With reference back to FIGS. 3, 9, and 14B, in an embodiment of blocks 410 and 412, the VCP sub-engine 304*b* may then use the visualization access information URL generated at block 408 to access a visualization generated by the Oxidized networking device configuration tool, and then provide that visualization via the network 204 and to the management device 206 such that it is displayed on the VCP application 900. As can be seen in FIG. 16B, the VCP sub-engine 304*b* may cause the VCP application 900/100 to display a "show running-configuration" CLI command 1604 that corresponds to the "show running-configuration" CLI command 1600 provided on the CLI application 702/800, a visualization 1606 that one of skill in the art in possession of the present disclosure will appreciate may be provided by any visualizations generated by the Oxidized networking device configuration tool that may be mapped to the "show-running-configuration" CLI command key via the URL template and resulting URL discussed above, and a native visualization link 1606*a* that may be selected by the user to access the visualization 1606 natively in the Oxidized networking device configuration tool. As will be appreciated by one of skill in the art in possession of the present disclosure, the visualization 1606 provided in the VCP application 1000 in FIG. 16B is conventionally accessed natively via the selection of multiple GUI-based buttons, tabs, and/or other elements in the Oxidized networking device configuration tool, but may be provided in the VCP application 1000 automatically in response to the provisioning of the "show running-configuration" CLI command 1600 on the CLI application 702/800.

In some examples, the VCP sub-engine 304*b* may use the visualization access information URLs described above to retrieve the visualization 1606 from the Oxidized networking device configuration tool, and then provide (e.g., append) that visualization in the VCP application 900/1000 as described above. However, in other examples, the VCP sub-engine 304*b* may "embed" the visualization access information URL from the Oxidized networking device configuration tool in the VCP application 900/1000 in order to provide the visualization 1606 in the VCP application 900/1000 as described above. In either situation, one of skill in the art in possession of the present disclosure how the visualization 1606 may dynamically update (or be dynamically updated) while the CLI response 1602 provided on the CLI application 702/800 may remain static (i.e., the CLI response 1602 provides CLI response information retrieved at the time the "show running-configuration" CLI command 1600 was received, while the visualization 1606 may continue to update following the receiving of the "show running-configuration" CLI command 1600).

Figure 17A:
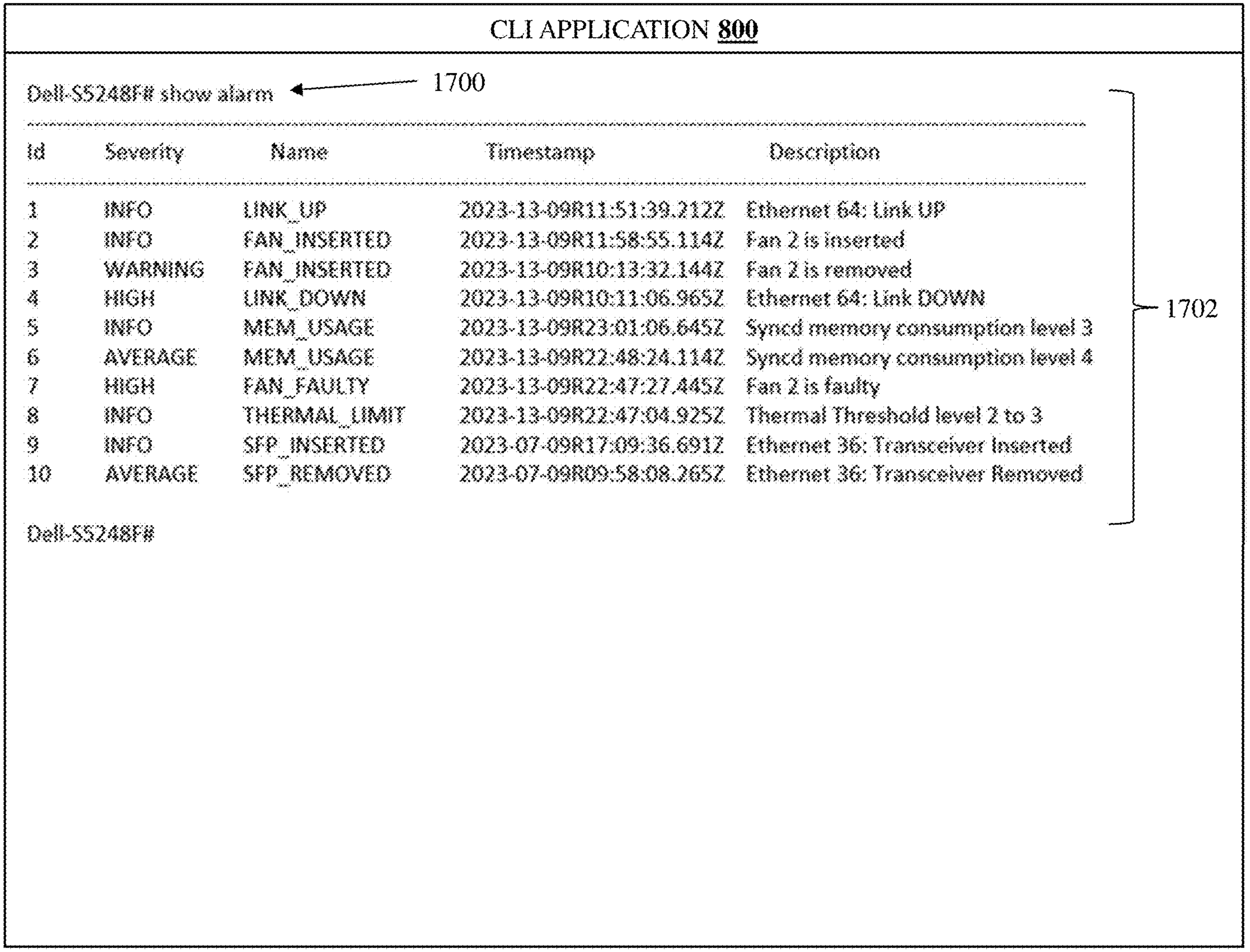
FIG. 17A is screenshot view illustrating an embodiment of a CLI application displayed on the management device of FIG. 9 during the method of FIG. 4.

With reference to FIGS. 3, 9, 17A and 17B, another specific example of blocks 404-412 of the method 400 is illustrated and described. In an embodiment of block 404, a user of the management device 206 has provided a "show alarm" CLI command 1700 in the CLI application 702/800 to transmit that CLI command via the network 204 and to the CLI sub-engine 304*a* in the networking engine 204 (i.e., via the communication system 310), and as described above the CLI sub-engine 702 will share that CLI command with the VCP sub-engine 304*b*. In addition, the CLI sub-engine 304*a* will execute the "show alarm" CLI command 1700 to generate CLI response information, and as illustrated in FIG. 17A the CLI sub-engine 304*a* may transmit that CLI response information via the network 204 and to the management device 206 such that it displayed as a CLI response 1702 on the CLI application 702/800.

With reference to FIGS. 3 and 6, in an embodiment of block 406 and in response to receiving the CLI command, the VCP sub-engine 304*b* may access the VCP configuration information 600 in the networking database 306 and identify the Zabbix infrastructure monitoring tool as the visualization application that is configured to generate a visualization associated with execution of the CLI command by determining that the "show-alarm" CLI command key is included in the visualization information object 608 for the Zabbix infrastructure monitoring tool.

With reference back to FIGS. 3 and 6, in an embodiment of block 408, the VCP sub-engine 304*b* may then access the URL template provided in the visualization information object 608 for the "show-alarm" CLI command key, and may perform parameter substitution on that URL template to generate a URL that provides an embodiment of the visualization access information of the present disclosure. In this example, that parameter substitution includes providing the "hostname" of the networking device 202/300 in the URL template included in the visualization information object 608 for the "show-alarm" CLI command in order to provide a visualization access information URL for the "show alarm" CLI command 1700.

Figure 17B:
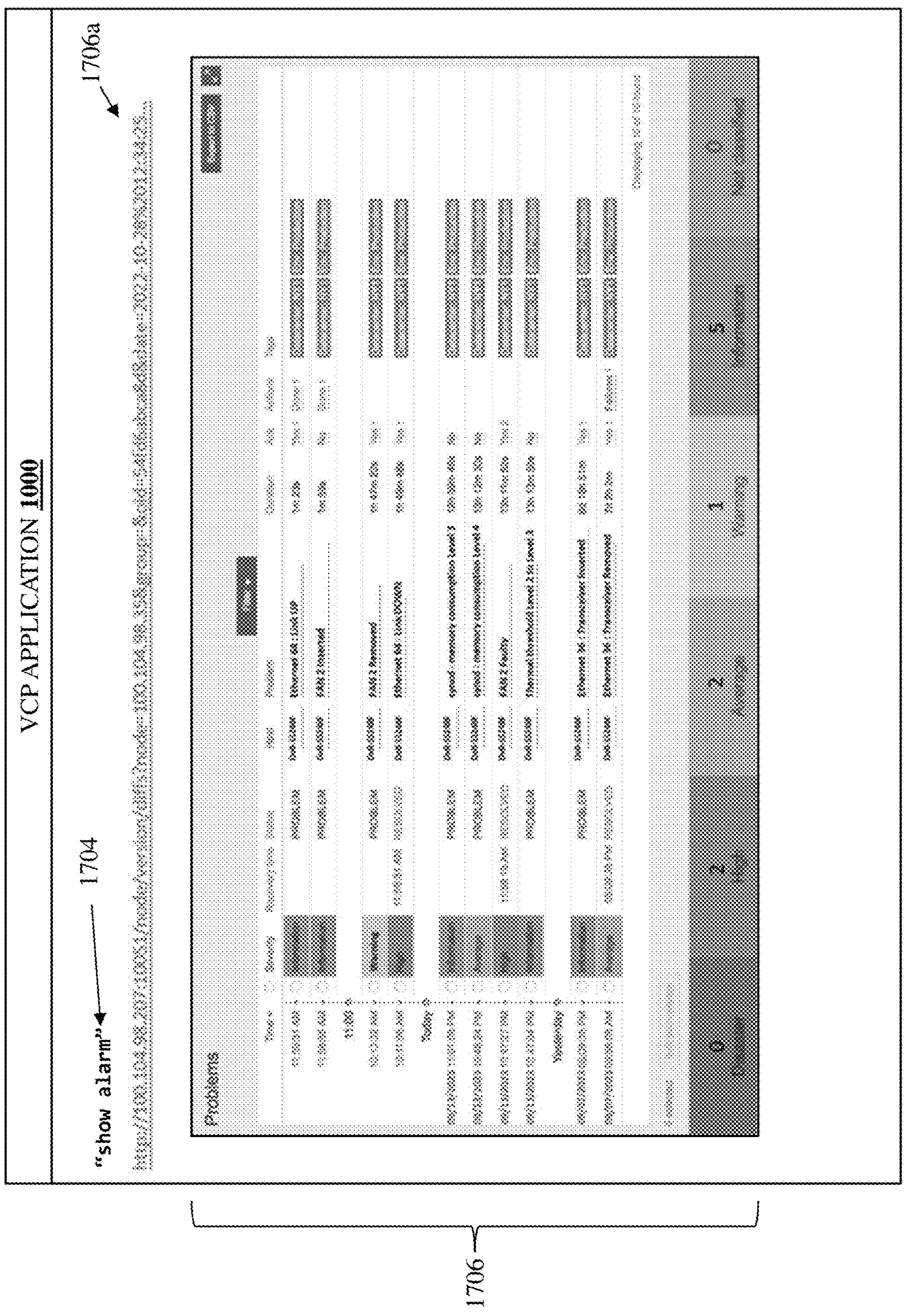
FIG. 17B is screenshot view illustrating an embodiment of a VCP application displayed on the management device of FIG. 9 during the method of FIG. 4.

With reference back to FIGS. 3, 9, and 17B, in an embodiment of blocks 410 and 412, the VCP sub-engine 304*b* may then use the visualization access information URL generated at block 408 to access a visualization generated by the Zabbix infrastructure monitoring tool, and then provide that visualization via the network 204 and to the management device 206 such that it is displayed on the VCP application 900. As can be seen in FIG. 17B, the VCP sub-engine 304*b* may cause the VCP application 900/100 to display a "show alarm" CLI command 1704 that corresponds to the "show alarm" CLI command 1700 provided on the CLI application 702/800, a visualization 1706 that one of skill in the art in possession of the present disclosure will appreciate may be provided by any visualizations generated by the Zabbix infrastructure monitoring tool that may be mapped to the "show-alarm" CLI command key via the URL template and resulting URL discussed above, and a native visualization link 1706*a* that may be selected by the user to access the visualization 1706 natively in the Zabbix infrastructure monitoring tool. As will be appreciated by one of skill in the art in possession of the present disclosure, the visualization 1706 provided in the VCP application 1000 in FIG. 17B is conventionally accessed natively via the selection of multiple GUI-based buttons, tabs, and/or other elements in the Zabbix infrastructure monitoring tool, but may be provided in the VCP application 1000 automatically in response to the provisioning of the "show alarm" CLI command 1700 on the CLI application 702/800.

In some examples, the VCP sub-engine 304*b* may use the visualization access information URLs described above to retrieve the visualization 1706 from the Zabbix infrastructure monitoring tool, and then provide (e.g., append) that visualization in the VCP application 900/1000 as described above. However, in other examples, the VCP sub-engine 304*b* may "embed" the visualization access information URL from the Zabbix infrastructure monitoring tool in the VCP application 900/1000 in order to provide the visualization 1706 in the VCP application 900/1000 as described above. In either situation, one of skill in the art in possession of the present disclosure how the visualization 1706 may dynamically update (or be dynamically updated) while the CLI response 1702 provided on the CLI application 702/800 may remain static (i.e., the CLI response 1702 provides CLI response information retrieved at the time the "show alarm" CLI command 1700 was received, while the visualization 1706 may continue to update following the receiving of the "show alarm" CLI command 1700).

Figure 18A:
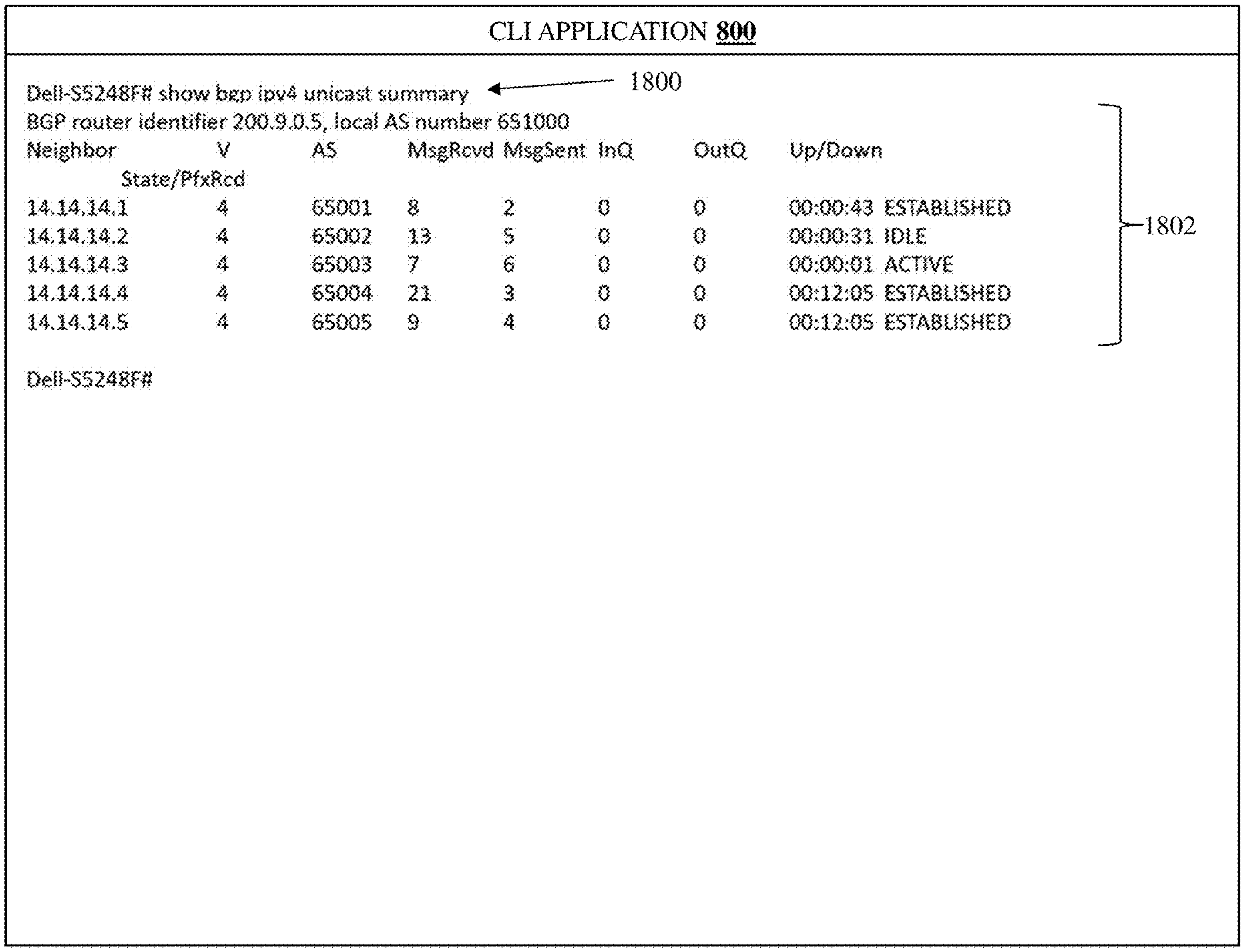
FIG. 18A is screenshot view illustrating an embodiment of a CLI application displayed on the management device of FIG. 9 during the method of FIG. 4.

With reference to FIGS. 3, 9, 18A and 18B, another specific example of blocks 404-412 of the method 400 is illustrated and described. In an embodiment of block 404, a user of the management device 206 has provided a "show bgp ipv4 unicast summary" CLI command 1800 in the CLI application 702/800 to transmit that CLI command via the network 204 and to the CLI sub-engine 304*a* in the networking engine 204 (i.e., via the communication system 310), and as described above the CLI sub-engine 702 will share that CLI command with the VCP sub-engine 304*b*. In addition, the CLI sub-engine 304*a* will execute the "show bgp ipv4 unicast summary" CLI command 1800 to generate CLI response information, and as illustrated in FIG. 18A the CLI sub-engine 304*a* may transmit that CLI response information via the network 204 and to the management device 206 such that it displayed as a CLI response 1802 on the CLI application 702/800.

With reference to FIGS. 3 and 6, in an embodiment of block 406 and in response to receiving the CLI command, the VCP sub-engine 304*b* may access the VCP configuration information 600 in the networking database 306 and identify the Grafana web analytics and monitoring application as the visualization application that is configured to generate a visualization associated with execution of the CLI command by determining that the "show-bgp-ipv4-unicast-summary" CLI command key is included in the visualization information object 602 for the Grafana web analytics and monitoring application.

With reference back to FIGS. 3 and 6, in an embodiment of block 408, the VCP sub-engine 304*b* may then access the URL template provided in the visualization information object 602 for the "show-bgp-ipv4-unicast-summary" CLI command key, and may perform parameter substitution on that URL template to generate a URL that provides an embodiment of the visualization access information of the present disclosure. In this example, that parameter substitution includes providing the "start-time" and "end-time" from the "show bgp ipv4 unicast summary" CLI command 1800, the "hostname" of the networking device 202/300, and a "grafana-jwt-token" JWT for the Grafana web analytics and monitoring application in the URL template included in the visualization information object 602 for the "show-bgp-ipv4-unicast-summary" CLI command in order to provide a visualization access information URL for the "show bgp ipv4 unicast summary" CLI command 1800.

Figure 18B:
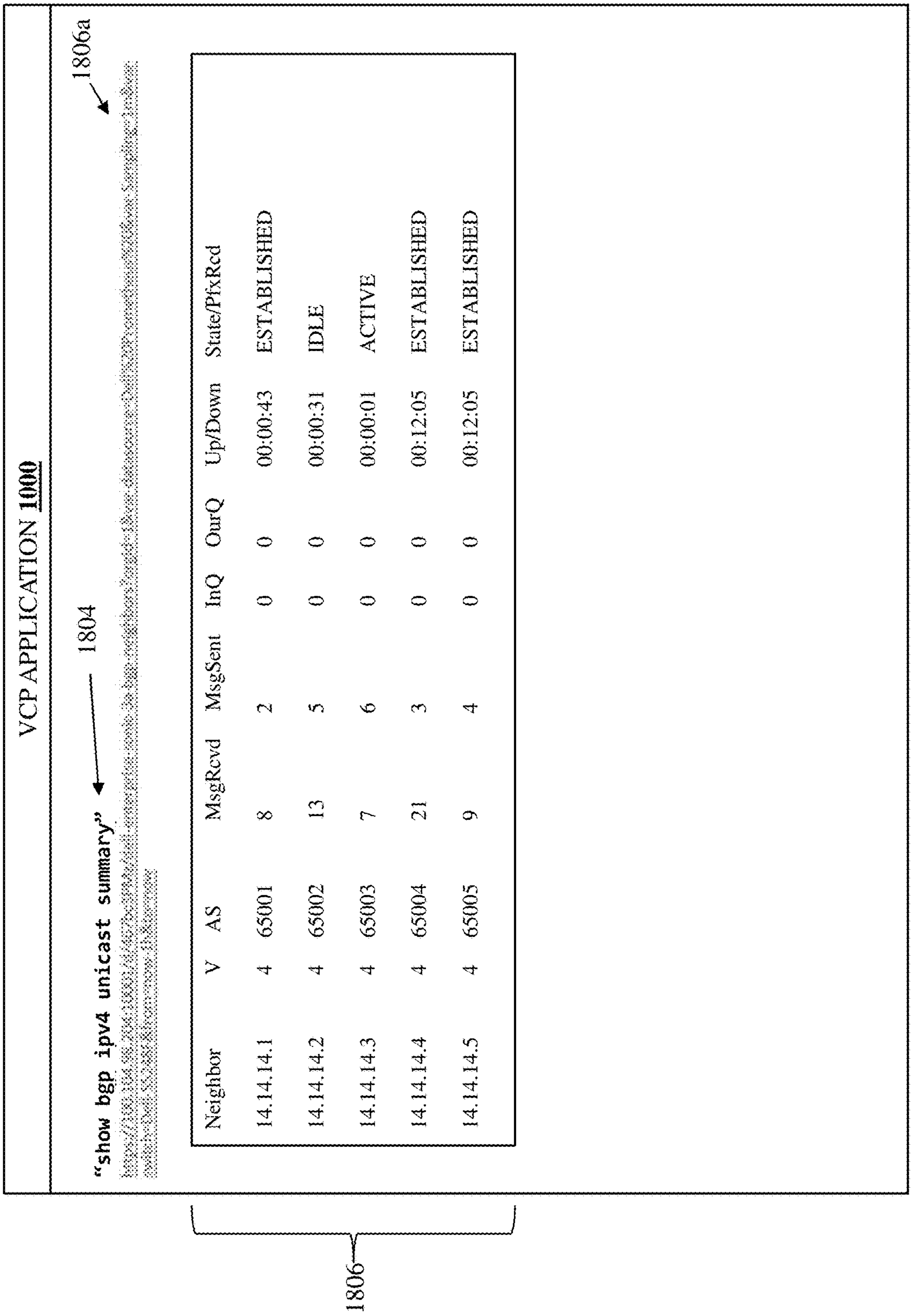
FIG. 18B is screenshot view illustrating an embodiment of a VCP application displayed on the management device of FIG. 9 during the method of FIG. 4.

With reference back to FIGS. 3, 9, and 18B, in an embodiment of blocks 410 and 412, the VCP sub-engine 304*b* may then use the visualization access information URL generated at block 408 to access a visualization generated by the Grafana web analytics and monitoring application, and then provide that visualization via the network 204 and to the management device 206 such that it is displayed on the VCP application 900. As can be seen in FIG. 18B, the VCP sub-engine 304*b* may cause the VCP application 900/100 to display a "show bgp ipv4 unicast summary" CLI command 1804 that corresponds to the "show bgp ipv4 unicast summary" CLI command 1800 provided on the CLI application 702/800, a visualization 1806 that one of skill in the art in possession of the present disclosure will appreciate may be provided by any visualizations generated by the Grafana web analytics and monitoring application (e.g., a Grafana "dashboard", "panel", "screen", etc.) that may be mapped to the "show-bgp-ipv4-unicast-summary" CLI command key via the URL template and resulting URL discussed above, and a native visualization link 1806*a* that may be selected by the user to access the visualization 1806 natively in the Grafana web analytics and monitoring application. As will be appreciated by one of skill in the art in possession of the present disclosure, the visualization 1806 provided in the VCP application 1000 in FIG. 18B is conventionally accessed natively via the selection of multiple GUI-based buttons, tabs, and/or other elements in the Grafana web analytics and monitoring application, but may be provided in the VCP application 1000 automatically in response to the provisioning of the "show bgp ipv4 unicast summary" CLI command 1800 on the CLI application 702/800.

In some examples, the VCP sub-engine 304*b* may use the visualization access information URLs described above to retrieve the visualization 1806 from the Grafana web analytics and monitoring application, and then provide (e.g., append) that visualization in the VCP application 900/1000 as described above. However, in other examples, the VCP sub-engine 304*b* may "embed" the visualization access information URL from the Grafana web analytics and monitoring application in the VCP application 900/1000 in order to provide the visualization 1806 in the VCP application 900/1000 as described above. In either situation, one of skill in the art in possession of the present disclosure how the visualization 1806 may dynamically update (or be dynamically updated) while the CLI response 1802 provided on the CLI application 702/800 may remain static (i.e., the CLI response 1802 provides CLI response information retrieved at the time the "show bgp ipv4 unicast summary" CLI command 1800 was received, while the visualization 1806 may continue to update following the receiving of the "show bgp ipv4 unicast summary" CLI command 1800).

Figure 19A:
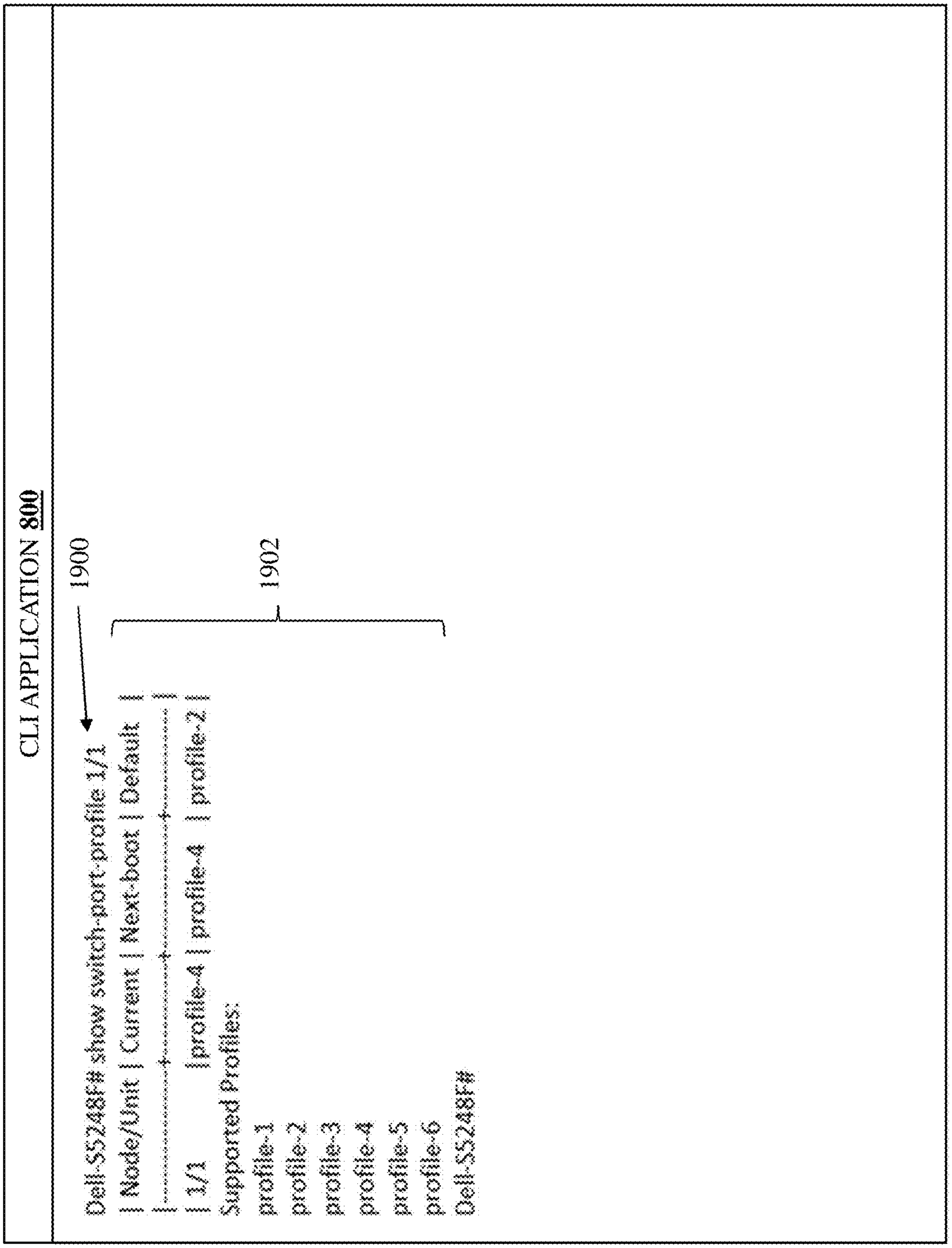
FIG. 19A is screenshot view illustrating an embodiment of a CLI application displayed on the management device of FIG. 9 during the method of FIG. 4.

With reference to FIGS. 3, 9, 19A and 19B, another specific example of blocks 404-412 of the method 400 is illustrated and described. In an embodiment of block 404, a user of the management device 206 has provided a "show switch-port-profile 1/1" CLI command 1900 in the CLI application 702/800 to transmit that CLI command via the network 204 and to the CLI sub-engine 304*a* in the networking engine 204 (i.e., via the communication system 310), and as described above the CLI sub-engine 702 will share that CLI command with the VCP sub-engine 304*b*. In addition, the CLI sub-engine 304*a* will execute the "show switch-port-profile 1/1" CLI command 1900 to generate CLI response information, and as illustrated in FIG. 19A the CLI sub-engine 304*a* may transmit that CLI response information via the network 204 and to the management device 206 such that it displayed as a CLI response 1902 on the CLI application 702/800.

With reference to FIGS. 3 and 6, in an embodiment of block 406 and in response to receiving the CLI command, the VCP sub-engine 304*b* may access the VCP configuration information 600 in the networking database 306 and identify the local visualization application as the visualization application that is configured to generate a visualization associated with execution of the CLI command by determining that the "show-switch-port-profile" CLI command key is included in the visualization information object 610 for the local visualization application.

With reference back to FIGS. 3 and 6, in an embodiment of block 408, the VCP sub-engine 304*b* may then access the URL template provided in the visualization information object 610 for the "show-switch-port-profile" CLI command, and one of skill in the art in possession of the present disclosure will appreciate how the parameter substitution operations described above may be skipped for the local visualization application, as URL template need only be provided with the IP address and port for the local visualization application in the visualization information object 610 in order to generate the visualization access information URL in this embodiment.

Figure 19B:
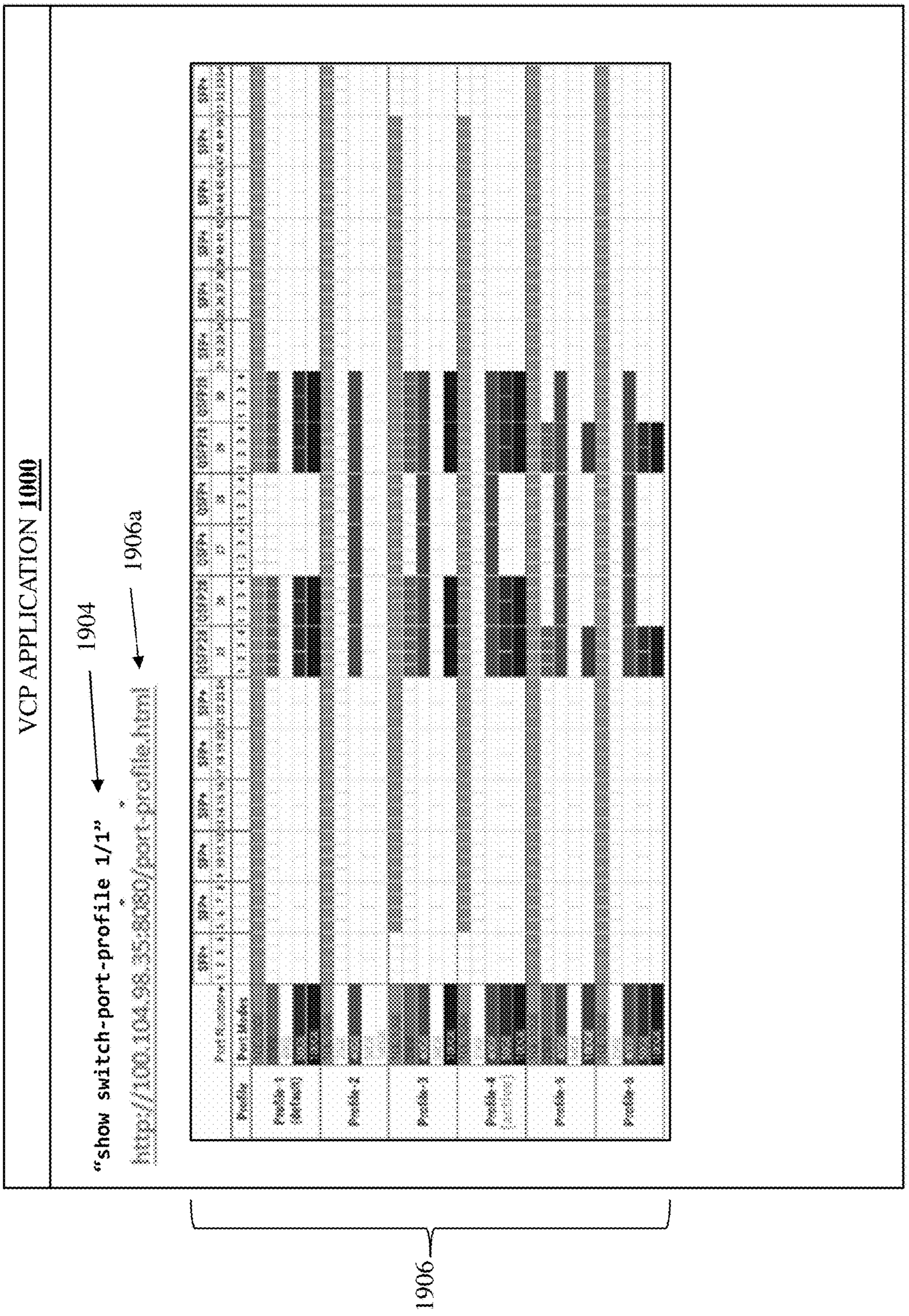
FIG. 19B is screenshot view illustrating an embodiment of a VCP application displayed on the management device of FIG. 9 during the method of FIG. 4.

With reference back to FIGS. 3, 9, and 19B, in an embodiment of blocks 410 and 412, the VCP sub-engine 304*b* may then use the visualization access information URL generated at block 408 to access a visualization generated by the local visualization application, and then provide that visualization via the network 204 and to the management device 206 such that it is displayed on the VCP application 900. As can be seen in FIG. 19B, the VCP sub-engine 304*b* may cause the VCP application 900/100 to display a "show switch-port-profile 1/1" CLI command 1904 that corresponds to the "show switch-port-profile 1/1" CLI command 1900 provided on the CLI application 702/800, a visualization 1906 that one of skill in the art in possession of the present disclosure will appreciate may be provided by any visualizations generated by the local visualization application that may be mapped to the "show-switch-port-profile" CLI command key via the URL template and resulting URL discussed above, and a native visualization link 1906*a* that may be selected by the user to access the visualization 1906 natively in the local visualization application. As will be appreciated by one of skill in the art in possession of the present disclosure, the visualization 1906 provided in the VCP application 1000 in FIG. 19B is conventionally accessed natively via the selection of multiple GUI-based buttons, tabs, and/or other elements in the local visualization application, but may be provided in the VCP application 1000 automatically in response to the provisioning of the "show switch-port-profile 1/1" CLI command 1900 on the CLI application 702/800.

In some examples, the VCP sub-engine 304*b* may use the visualization access information URLs described above to retrieve the visualization 1906 from the local visualization application, and then provide (e.g., append) that visualization in the VCP application 900/1000 as described above. However, in other examples, the VCP sub-engine 304*b* may "embed" the visualization access information URL from the local visualization application in the VCP application 900/1000 in order to provide the visualization 1906 in the VCP application 900/1000 as described above. In either situation, one of skill in the art in possession of the present disclosure how the visualization 1906 may dynamically update (or be dynamically updated) while the CLI response 1902 provided on the CLI application 702/800 may remain static (i.e., the CLI response 1902 provides CLI response information retrieved at the time the ""show switch-port-profile 1/1" CLI command 1900 was received, while the visualization 1906 may continue to update following the receiving of the "show switch-port-profile 1/1" CLI command 1900).

Figure 20B:
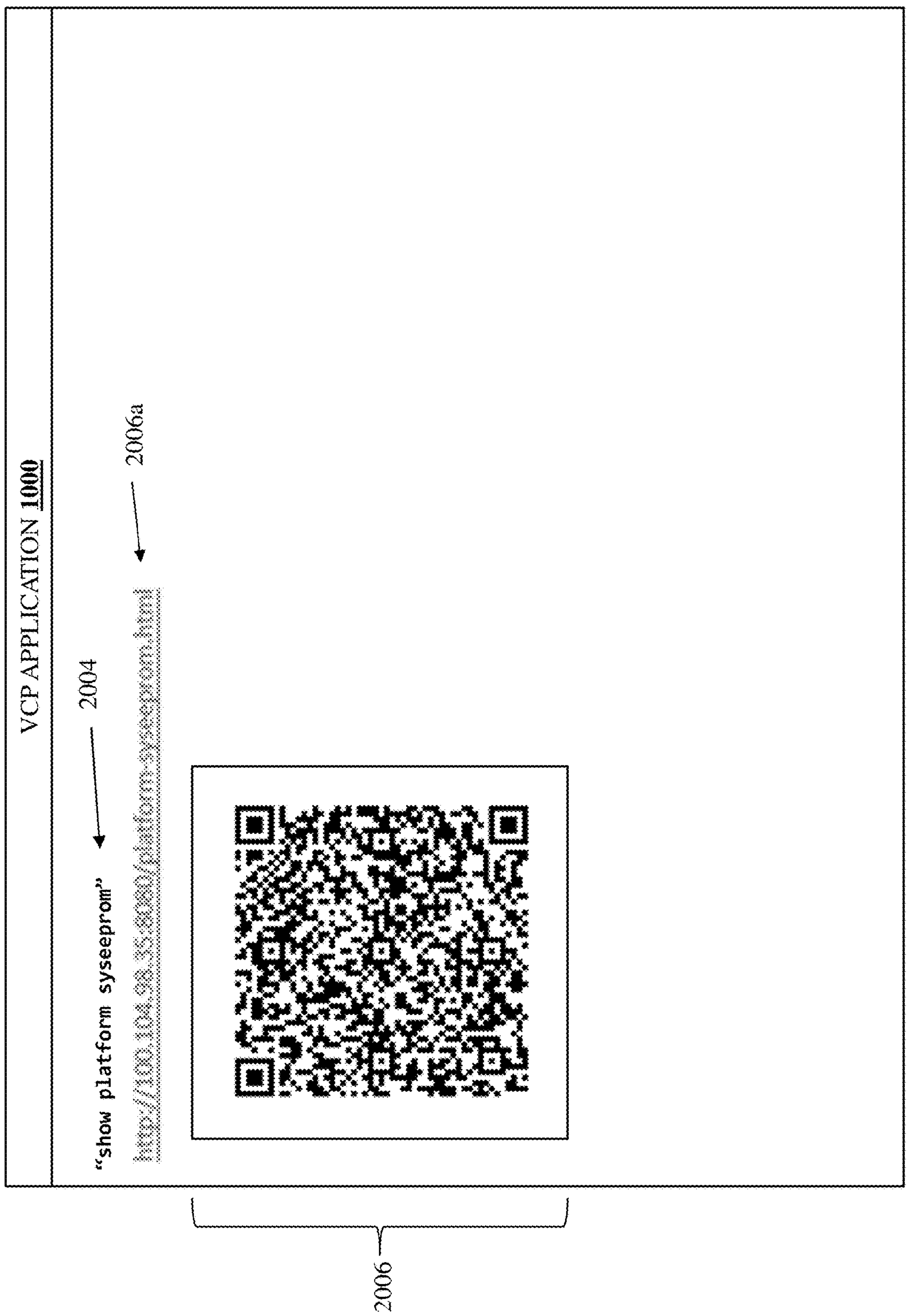
FIG. 20B is screenshot view illustrating an embodiment of a VCP application displayed on the management device of FIG. 9 during the method of FIG. 4.

With reference to FIGS. 3, 9, 20A and 20B, another specific example of blocks 404-412 of the method 400 is illustrated and described. In an embodiment of block 404, a user of the management device 206 has provided a "show platform syseeprom" CLI command 2000 in the CLI application 702/800 to transmit that CLI command via the network 204 and to the CLI sub-engine 304*a* in the networking engine 204 (i.e., via the communication system 310), and as described above the CLI sub-engine 702 will share that CLI command with the VCP sub-engine 304*b*. In addition, the CLI sub-engine 304*a* will execute the "show platform syseeprom" CLI command 2000 to generate CLI response information, and as illustrated in FIG. 20A the CLI sub-engine 304*a* may transmit that CLI response information via the network 204 and to the management device 206 such that it displayed as a CLI response 2002 on the CLI application 702/800.

With reference to FIGS. 3 and 6, in an embodiment of block 406 and in response to receiving the CLI command, the VCP sub-engine 304*b* may access the VCP configuration information 600 in the networking database 306 and identify the local visualization application as the visualization application that is configured to generate a visualization associated with execution of the CLI command by determining that the "show-platform-syseeprom" CLI command key is included in the visualization information object 610 for the local visualization application.

With reference back to FIGS. 3 and 6, in an embodiment of block 408, the VCP sub-engine 304*b* may then access the URL template provided in the visualization information object 610 for the "show-platform-syseeprom" CLI command, and one of skill in the art in possession of the present disclosure will appreciate how the parameter substitution operations described above may be skipped for the local visualization application, as URL template need only be provided with the IP address and port for the local visualization application in the visualization information object 610 in order to generate the visualization access information URL in this embodiment.

With reference back to FIGS. 3, 9, and 20B, in an embodiment of blocks 410 and 412, the VCP sub-engine 304*b* may then use the visualization access information URL generated at block 408 to access a visualization generated by the local visualization application, and then provide that visualization via the network 204 and to the management device 206 such that it is displayed on the VCP application 900. As can be seen in FIG. 20B, the VCP sub-engine 304*b* may cause the VCP application 900/100 to display a "show platform syseeprom" CLI command 2004 that corresponds to the "show platform syseeprom" CLI command 2000 provided on the CLI application 702/800, a visualization 2006 that one of skill in the art in possession of the present disclosure will appreciate may be provided by any visualizations generated by the local visualization application that may be mapped to the "show-platform-syseeprom" CLI command key via the URL template and resulting URL discussed above, and a native visualization link 2006*a* that may be selected by the user to access the visualization 2006 natively in the local visualization application. As will be appreciated by one of skill in the art in possession of the present disclosure, the visualization 2006 provided in the VCP application 1000 in FIG. 20B is conventionally accessed natively via the selection of multiple GUI-based buttons, tabs, and/or other elements in the local visualization application, but may be provided in the VCP application 1000 automatically in response to the provisioning of the "show platform syseeprom" CLI command 2000 on the CLI application 702/800.

In some examples, the VCP sub-engine 304*b* may use the visualization access information URLs described above to retrieve the visualization 2006 from the local visualization application, and then provide (e.g., append) that visualization in the VCP application 900/1000 as described above. However, in other examples, the VCP sub-engine 304*b* may "embed" the visualization access information URL from the local visualization application in the VCP application 900/1000 in order to provide the visualization 2006 in the VCP application 900/1000 as described above. In either situation, one of skill in the art in possession of the present disclosure how the visualization 2006 may dynamically update (or be dynamically updated) while the CLI response 2002 provided on the CLI application 702/800 may remain static (i.e., the CLI response 2002 provides CLI response information retrieved at the time the "show platform syseeprom" CLI command 2000 was received, while the visualization 2006 may continue to update following the receiving of the "show platform syseeprom" CLI command 2000).

However, while several specific examples have been provided of the use of "show" command to provide for the monitoring of the networking device 202/300, one of skill in the art in possession of the present disclosure will appreciate how the functionality described above may be utilized with management commands, control commands, and/or any other CLI commands that would be apparent to one of skill in the art in possession of the present disclosure.

Thus, systems and methods have been described that provide a "Visualization Co-Pilot" that "snoops" CLI commands and uses them to access and display visualization(s) that are associated with the execution of those CLI commands and that are generated by visualization application(s). For example, the CLI information visualization system of the present disclosure may include a management device coupled to a computing device. The computing device includes a CLI subsystem that provides a CLI session on the computing device for the management device. The computing device also includes a VCP subsystem that receives a CLI command from the CLI subsystem that was provided by the management device during the CLI session, and determines one or more visualization applications that are configured to generate a visualization associated with the execution of the CLI command. The VCP subsystem then generates visualization access information using the CLI command, uses the visualization access information to access at least one visualization generated by the one or move visualization applications, and provides the at least one visualization for display on the management device. As such, a user of a CLI may use that CLI as the primary tool to interact with the computing device, while having the most relevant visualizations for the responses to their CLI commands provided by the VCP without having to manually switch between the CLI and/or multiple visualization applications.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Command Line Interface (CLI) information visualization system, comprising:

a management device; and a computing device that is coupled to the management device and that includes:

at least one processor; and a memory that includes Command Line Interface (CLI) subsystem instructions that, when executed by the at least one processor, cause the at least one processor to provide a CLI session on the computing device for the management device, wherein the memory also includes Visualization Co-Pilot (VCP) subsystem instructions that, when executed by the at least one processor, cause the at least one processor to:

receive a CLI command provided by the management device during the CLI session;

determine one or more visualization applications that are configured to generate a visualization associated with execution of the CLI command;

generate, using the CLI command, visualization access information;

access, using the visualization access information, at least one visualization generated by the one or more visualization applications; and automatically provide, for display on the management device, the at least one visualization.

2. The system of claim 1, wherein the VCP subsystem is configured to generate the visualization access information using the CLI command and identifying information for the computing device.

3. The system of claim 2, wherein the generating the visualization access information using the CLI command and the identifying information for the computing device includes:

performing parameter substitution on a Uniform Resource Locator (URL) template to provide the identifying information for the computing device and at least one argument in the CLI command in the URL template to generate a URL that provides the visualization access information.

4. The system of claim 1, wherein the VCP subsystem is configured to:

dynamically update the at least visualization provided for display on the management device.

5. The system of claim 1, wherein the VCP subsystem is configured to:

provide, for display on the management device adjacent the at least one visualization, the CLI command.

6. The system of claim 1, wherein the VCP subsystem is configured to:

provide, for display on the management device adjacent the at least one visualization, a respective link to each visualization application providing the at least one visualization.

7. The system of claim 1, wherein the computing device is configured to:

receive, prior to the VCP subsystem receiving the CLI command, VCP configuration information that identifies each of the one or more visualization applications, includes visualization application access information for each of the one or more visualization applications, identifies the CLI command, and includes a portion of the visualization access information generated using the CLI command.

8. An Information Handling System (IHS), comprising:

a processing system including at least one processor; and a memory system that is coupled to the processing system and that includes instructions that, when executed by the at least one processor included in the processing system, cause the at least one processor included in the processing system to provide a Visualization Co-Pilot (VCP) engine that is configured to:

receive, from a Command Line Interface (CLI) subsystem, a CLI command provided by a management device during a CLI session provided with the CLI subsystem;

determine one or more visualization applications that are configured to generate a visualization associated with execution of the CLI command;

generate, using the CLI command, visualization access information;

access, using the visualization access information, at least one visualization generated by the one or more visualization applications; and automatically provide, for display on the management device, the at least one visualization.

9. The IHS of claim 8, wherein the VCP engine is configured to generate the visualization access information using the CLI command and identifying information for the IHS.

10. The IHS of claim 9, wherein the generating the visualization access information using the CLI command and the identifying information for the IHS includes:

performing parameter substitution on a Uniform Resource Locator (URL) template to provide the identifying information for the IHS and at least one argument in the CLI command in the URL template to generate a URL that provides the visualization access information.

11. The IHS of claim 8, wherein the VCP engine is configured to:

dynamically update the at least visualization provided for display on the management device.

12. The IHS of claim 8, wherein the VCP engine is configured to:

provide, for display on the management device adjacent the at least one visualization, the CLI command.

13. The IHS of claim 8, wherein the VCP engine is configured to:

provide, for display on the management device adjacent the at least one visualization, a respective link to each visualization application providing the at least one visualization.

14. A method for visualizing information associated with Command Line Interface (CLI) commands, comprising:

receiving, by a Visualization Co-Pilot (VCP) subsystem from a Command Line Interface (CLI) subsystem, a CLI command provided by a management device during a CLI session provided with the CLI subsystem;

determining, by the VCP subsystem, one or more visualization applications that are configured to generate a visualization associated with execution of the CLI command;

generating, by the VCP subsystem using the CLI command, visualization access information;

accessing, by the VCP subsystem using the visualization access information, at least one visualization generated by the one or more visualization applications; and automatically providing, by the VCP subsystem for display on the management device, the at least one visualization.

15. The method of claim 14, further comprising:

generating, by the VCP subsystem, the visualization access information using the CLI command and identifying information for a computing device that provides the VCP subsystem and the CLI subsystem.

16. The method of claim 15, wherein the generating the visualization access information using the CLI command and the identifying information for the computing device includes:

performing, by the VCP subsystem, parameter substitution on a Uniform Resource Locator (URL) template to provide the identifying information for the computing device and at least one argument in the CLI command in the URL template to generate a URL that provides the visualization access information.

17. The method of claim 14, further comprising:

dynamically updating, by the VCP subsystem, the at least visualization provided for display on the management device.

18. The method of claim 14, further comprising:

providing, by the VCP subsystem for display on the management device adjacent the at least one visualization, the CLI command.

19. The method of claim 14, further comprising:

providing, by the VCP subsystem for display on the management device adjacent the at least one visualization, a respective link to each visualization application providing the at least one visualization.

20. The method of claim 14, further comprising:

receiving, by a computing device that includes the VCP subsystem and the CLI subsystem prior to the VCP subsystem receiving the CLI command, VCP configuration information that identifies each of the one or more visualization applications, includes visualization application access information for each of the one or more visualization applications, identifies the CLI command, and includes a portion of the visualization access information generated using the CLI command.

* * * * *